US005945132A

United States Patent [19]

Sullivan et al.

[11] Patent Number: 5,945,132

[45] Date of Patent: Aug. 31, 1999

[54] APPARATUS FOR MAKING COMPRESSED AGRICULTURAL FIBER STRUCTURAL BOARD

[75] Inventors: Barry J. Sullivan, Coppell; Louis J. Du Mouchel, Wichita Falls, both of Tex.

[73] Assignee: Agriboard Industries, Coppell, Tex.

[21] Appl. No.: 08/790,817

[22] Filed: Jan. 30, 1997

[51] Int. Cl.[6] .............................. B29C 43/24; B30B 11/02

[52] U.S. Cl. .......................... 425/143; 425/308; 425/457; 425/469

[58] Field of Search .................................... 425/308, 457, 425/469, 143

[56] References Cited

U.S. PATENT DOCUMENTS

| | | | |
|---|---|---|---|
| 3,890,077 | 6/1975 | Holman | 425/111 |
| 4,025,278 | 5/1977 | Tilby | 425/404 |
| 4,212,616 | 7/1980 | Tilby | 425/256 |
| 4,451,322 | 5/1984 | Dvorak | 156/461 |
| 5,413,746 | 5/1995 | Birjukov | 264/118 |
| 5,498,478 | 3/1996 | Hansen et al. | 428/372 |

*Primary Examiner*—Mary Lynn Theisen
*Attorney, Agent, or Firm*—Flehr Hohbach Test Albritton & Herbert LLP

[57] ABSTRACT

A mill is described for compacting agricultural fibrous matter, such as straw or other agricultural waste, into a structural board. The board is useful as a dominant part of a load bearing and insulating panel replacing many of the load bearing and insulating structures typically used to make small buildings, such as houses. The mill includes many features not found in previous mills of this type, including not only a packer to place material in front of an oscillating ram head as is known, but a precompactor arrangement to regulate the volume of material fed to the packer. Another feature incorporated into the mill to aid in achieving a consistent density is a pressure offset mechanism which adjusts the rate of core formation. The mill has a modular design to facilitate replacement of those components subjected to significant wear.

24 Claims, 20 Drawing Sheets

APPARATUS FOR MAKING COMPRESSED AGRICULTURAL FIBER STRUCTURAL BOARD

BACKGROUND OF THE INVENTION

The present invention relates to architectural structural materials and, more particularly, to a method and apparatus for compressing agricultural fiber, such as straw, to form the dominant component of a load bearing and insulating panel board usable in building.

Mankind has been intrigued for many years with the concept of using waste agricultural products, such as straw, to build relatively permanent domiciles and other generally permanent buildings. This concept includes replacing with panel boards made from agricultural fibers, the typical floor, wooden or metal stud wall, and ceilings and roof constructions normally used for on-site fabrication. The panel boards of this nature made in the past have the structural and insulation properties of the conventional structures that they replace. A previous apparatus designed to produce boards of agricultural fibrous material for panels of this type is described in U.S. Pat. No. 4,451,322.

Although the basic concept has been around for some time and many have attacked the problem of providing an appropriate core from agricultural fibrous material, various anomalies have prevented the commercial dominance of this concept over standard approaches. One problem is that of providing agriculture fiber having board cores of a reliably consistent density. Another is the relatively high cost of manufacturing such a fiber core.

SUMMARY OF THE INVENTION

The present invention provides a method and apparatus for making compressed agricultural fiber structural board in a reliably consistent manner relative to density and other variables. The method and apparatus of the invention accomplishes these tasks while still providing a structural board in a more cost effective manner than in the past.

There are many features of the method and apparatus which cooperate to provide the above goals. For example, although the apparatus of the invention is similar to previous designs in that a reciprocating ram is used to compress agriculture fiber into a desired core, it also includes a precompactor for regulating the volume of material which is fed to the ram. That is, it includes not only a packer to place material in front of an oscillating ram head as is known, it also includes a precompactor arrangement to regulate the volume of material fed to the packer. The invention also includes means for forming a uniformly dense mat of the material, and a moisture applicator for applying moisture to such mat as is necessary to, for example, adjust and even out the moisture content of the material prior to it being compressed. It further includes a pressure offset mechanism which adjusts the rate of core formation to aid in achieving a consistent density.

A major contributor to the relatively high costs of manufacture of an agricultural core for a building panel is the extensive wear on parts of the core forming machinery. The machinery down-time caused by part replacement adds significantly to the costs of making a construction board from agricultural fibrous material. The invention includes a modular design which facilitates replacement of parts and, hence, reduces the cost of manufacture. Moreover, the machinery is built so that the down-time required whenever it is desired to change the dimensions of the final product is minimized. And as will be described in more detail below, other steps have been taken to reduce down-time. The invention further includes a suspension system for the core forming ram as it reciprocates, designed to reduce wear and thus extend the operating time before part replacement becomes necessary.

Other features and advantages of the invention either will become apparent or will be described in connection with the following, more detailed description of a preferred embodiment of the invention and variations.

BRIEF DESCRIPTION OF THE DRAWINGS

With reference to the accompanying drawing.

DETAILED DESCRIPTION OF THE PREFERRED EMBODIMENT

The following relatively detailed description is provided to satisfy the patent statutes. It will be appreciated by those skilled in the art, though, that various changes and modifications can be made without departing from the invention. In this connection, the drawings show many engineering details that will not be described since they either are well known or an understanding of them is not needed by a person skilled in the art to make and use the invention and, as the terminology is meant in 35 U.S.C. §112, is not required to set forth the best mode contemplated by the inventors of carrying out the invention.

Figure 1:
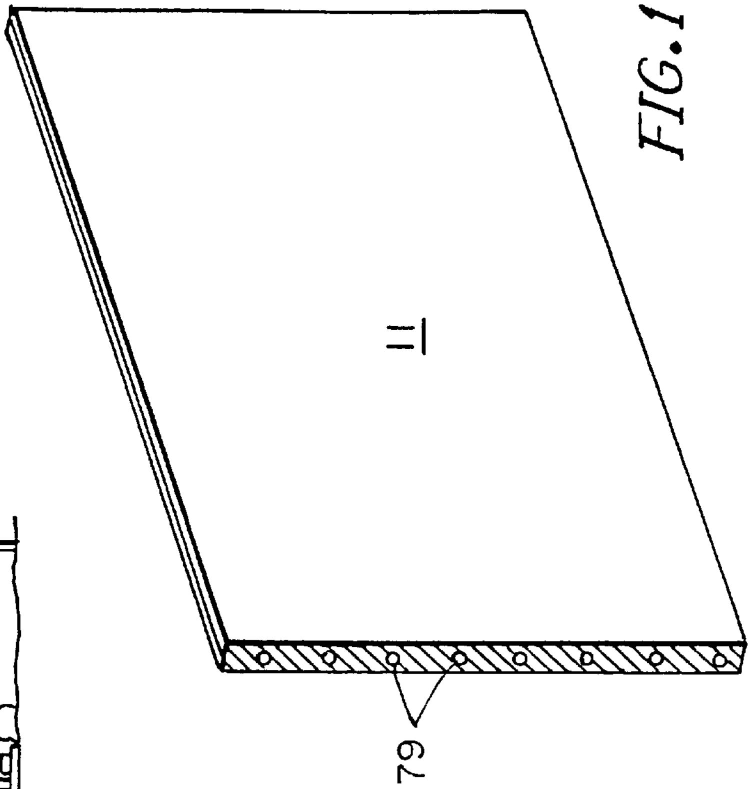
FIG. 1 is a pictorial view of a board produced by the preferred embodiment as it is to be incorporated into a building construction panel.
Figure 2:
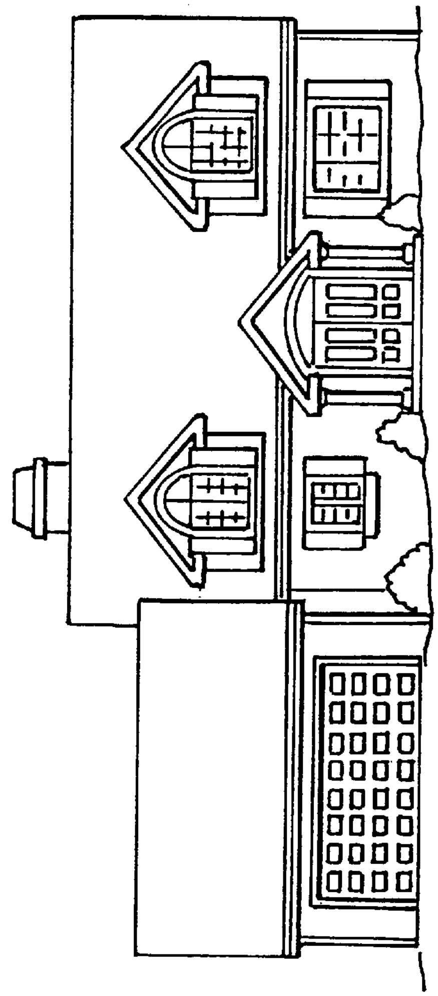
FIG. 2 is a schematic elevation view of a house of the type made from construction panel formed predominantly from board produced by a preferred embodiment of the method and apparatus of the invention.

The structural board 11 produced by the method and apparatus of the invention is illustrated in FIG. 1. As mentioned previously, building panels made from board of this nature are usable to construct domiciles, such as the domicile shown in FIG. 2, or other buildings. Such panels are not prevented by the presence of the board from having any desired cladding. For example, a panel which is to serve as the exterior panel of a domicile can be finished on the building exterior side as desired, such as is shown in FIG. 2. The interior side of each exterior panel can be finished differently.

The structural board 11 has many properties which it can provide to a building panel. For example, it can be load bearing. It also can provide thermal and sound insulation. In some instances, though, it is desirable to incorporate board produced by the invention into types of building panels which do not make use of all of the properties that can be provided by the board. For example, board 11 is usable to make filler panels for post and beam types of constructions. In such an arrangement, the potential load bearing properties of the board are not utilized.

Board 11 can be of any reasonable size but in an implementation for which the invention is particularly suited the board was provided with a thickness of about 3⅝" and a width and length of about 4'×8'. However, as will be discussed in more detail below, one of the features of the apparatus of the invention is that various aspects of the same are designed to facilitate thickness, length and width adjustments, so as to vary the dimensions of board produced by such apparatus. Moreover, the apparatus is adjustable to provide any desired board density within a selected range, such as between 12 and 22 lbs. per cu.ft.

Figure 3:
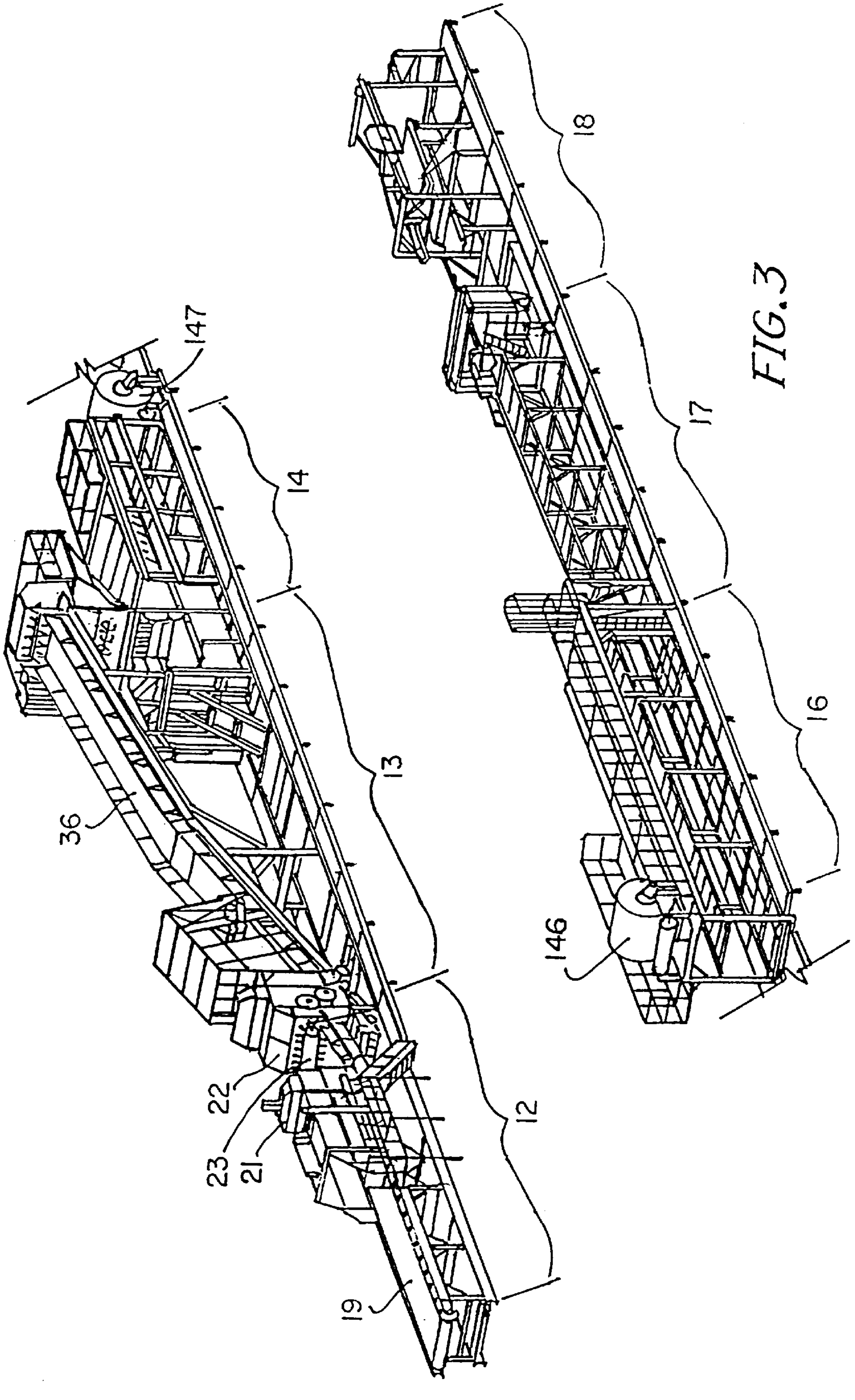
FIG. 3 is an overall pictorial view of a manufacturing production mill incorporating a preferred embodiment of the invention for making compressed agricultural fiber structural board of the type illustrated in FIG. 1.
Figure 6:
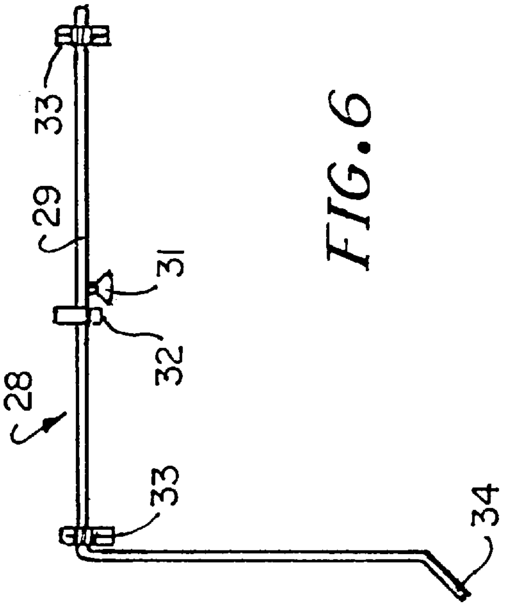
FIG. 6 is an enlarged elevation view of a moisture control device positioned at the exit end of the arrangement shown in FIG. 4.
Figure 5:
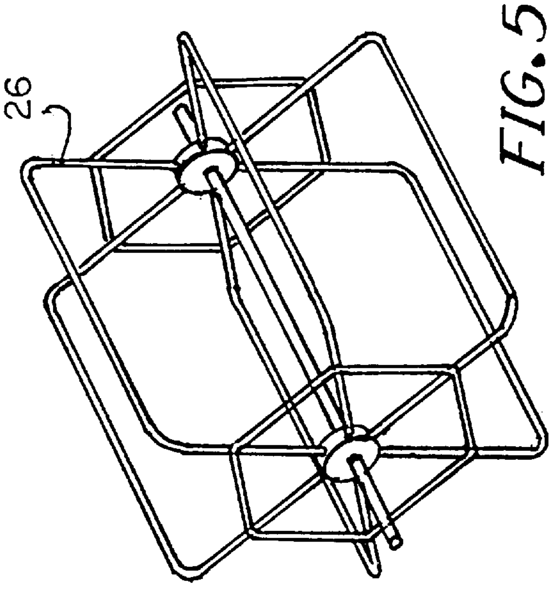
FIG. 5 is a view of a leveling reel of the preferred embodiment.

Reference is made to FIG. 3 which is an overall view of a full mill for producing agricultural fiber board for building panels. This mill represents a preferred embodiment of the apparatus of the invention and implements its method. It is designed for use with bales of cereal straw or the like, but it will be recognized by those skilled in the art that various agricultural products, both waste and products grown for the specific purpose of being converted into a building structural board, can provide agricultural fiber for the invention. Other agricultural materials contemplated for use with the invention include straw from other primary protein products, such as wheat, barley, oats and rice. It is also contemplated that the invention be used with materials other than straw, such as sugar cane bagasse, coconut husks, Johnson and switch grasses, etc.

Figure 4:
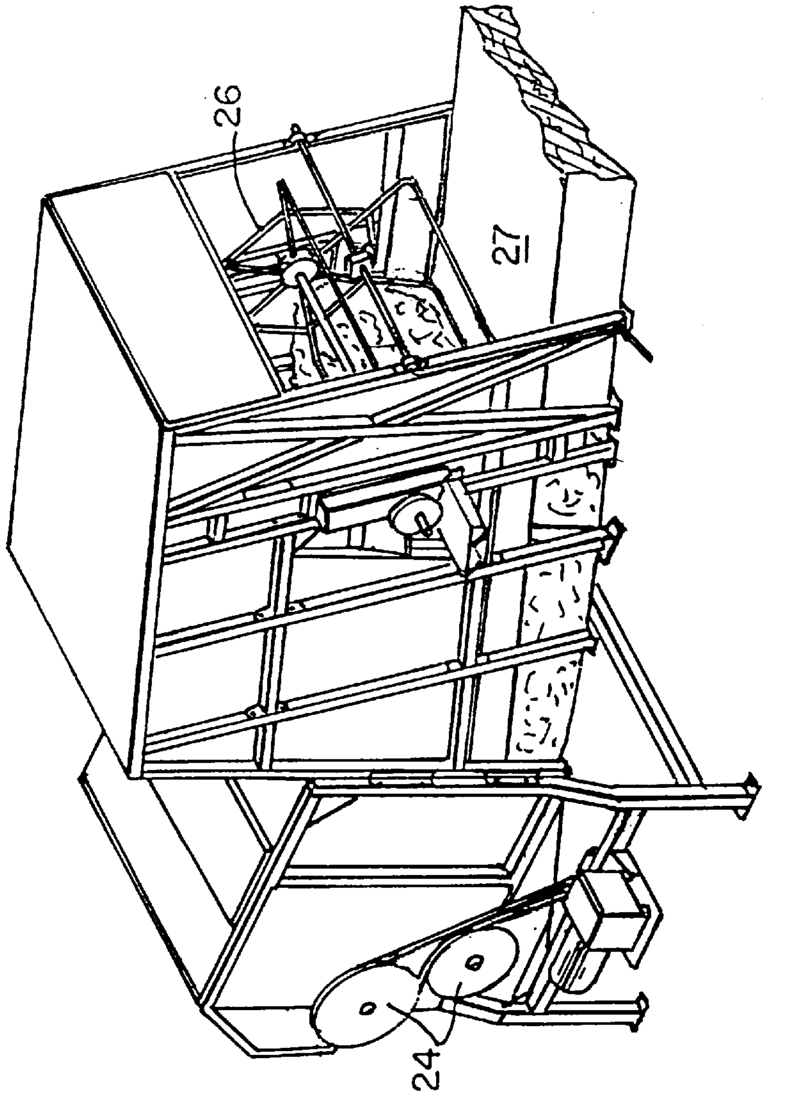
FIG. 4 is an enlarged view of some aspects of the preferred embodiment.

The mill of FIG. 3 is broken down into various major parts or skids 12–18. The flow is from the left-hand side (as viewed in the drawing) to the right-hand side. The apparatus forms fiber core, encases it in heavy paper stock, slices it and then covers the ends to produce board 11. Bales of the straw or other agricultural product providing fiber for the core are delivered to conveyor 19 of part 12 via, for example, a forklift or monorail. The twine or other tying material on the bales is removed so that bale flakes of the material are introduced by the conveyor into a housing having a dust hood 21 for separating the dust from the flakes and discharging such dust away from the atmosphere ambient to the mill. The flakes then enter a shredder 22 provided at the entry end of skid 13. (It should be noted that each of the skids 12 through 18 has its own conveyor, either in the form of a conveyor belt or conveyor rollers.) Shredder 22 has an entrance hold-back reel 23 which ensures that the speed of movement of the flakes matches that of the conveyor belt on skid 13. As can be seen in FIG. 4, the shredder includes a pair of counteracting rollers 24 having teeth which act to comb out the individual fibers from the flakes to aid in making a mat of the fibers. A rotating leveling reel 26 is provided at the exit end of the shredder enclosure. The result of the shredding (combing) and operation of the leveling reel 26 is the formation of a mat 27 of the fiber which is generally consistent in height. It is to be noted that the height of the leveling reel relative to the underlying conveyor can be adjusted via conventional approaches, such as by a screw and block arrangement as illustrated for adjusting the height of the bearings for such reel.

As a feature of the invention, it includes a moisture applicator, generally referred to by the reference numeral 28, for applying moisture to the mat after it is formed with the shredding rotors and leveling reel 26. Such moisture applicator simply is a water delivery pipe 29 having a central misting spray nozzle 31 and a solenoid operated on-off valve 32. The pipe 29 is suitably mounted as for example via clamps 33 to the shredder 22, leaving pipe entry end 34 to be connected to a source of water. (The other end of pipe 29 is closed.)

The solenoid is operable by an operator to apply moisture to the mat and, hence, to the fibers, as is believed necessary to assure consistent density in the final product. It is contemplated that the moisture application be made automatic based on sensing. It is also contemplated that multiple applicators, or potentially even a single applicator, can be used to tailor the water content of sections of a mat transverse to its direction of travel. It is further contemplated that applicator 28 feed a chemical retardant or other material to the fibers at this location.

It is important to note that the moisture applicator is positioned to apply moisture to the fibers after a mat is formed. This is in contrast to prior art arrangements in which moisture application is added to bale flakes without a mat being formed. It will be recognized that a much more uniform application of moisture to the fibers is achieved when one forms a mat before applying the moisture.

Figure 7:
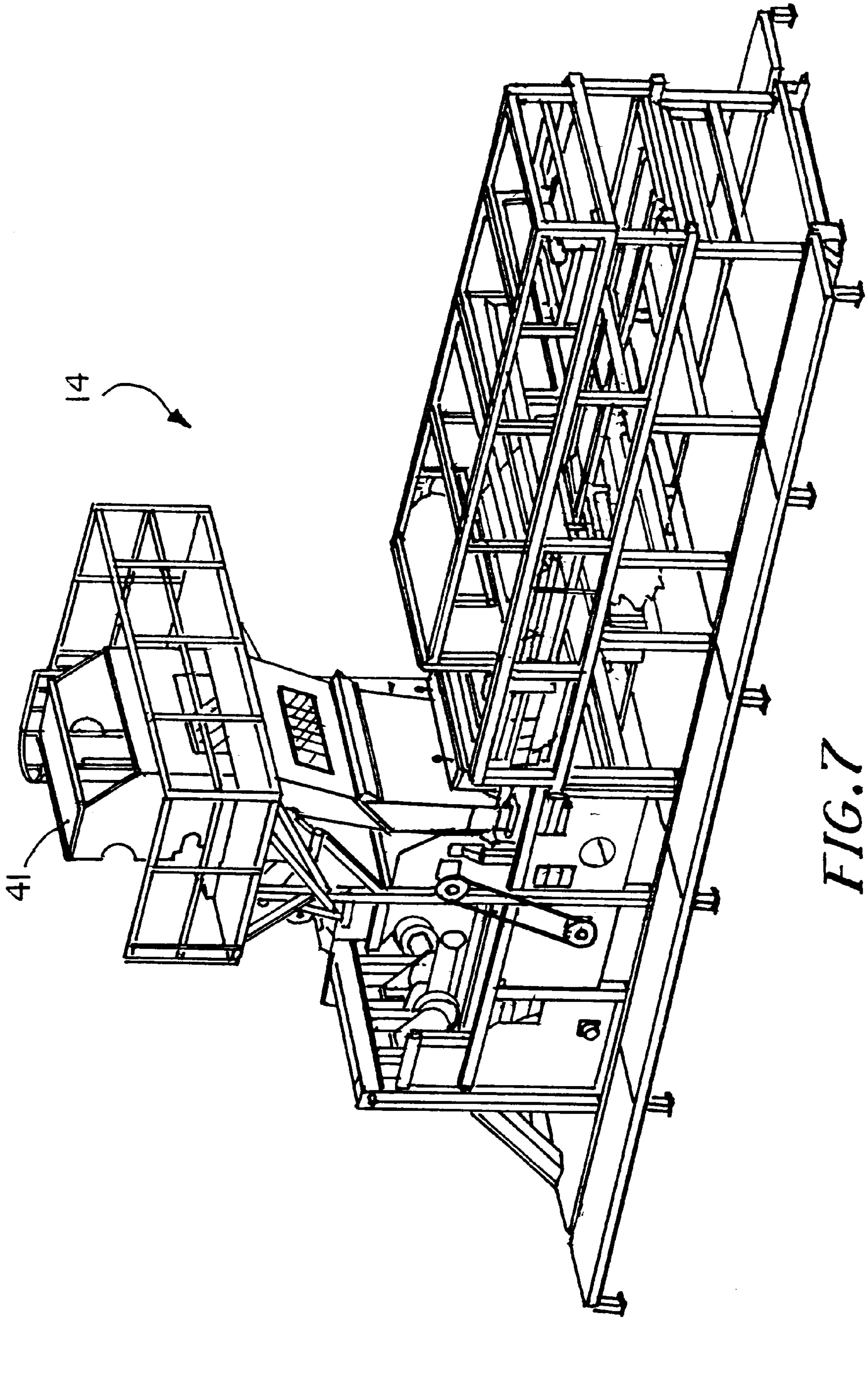
FIG. 7 is an enlarged view of an important part of the production mill preferred embodiment illustrated in FIG. 3.

Mat 27 flows up an inclined conveyor 36, to a core forming section represented in the drawing by the reference numeral 14. This section or skid is illustrated in some detail in FIGS. 7 and 8, and reference is made to these figures for an overall understanding of the core forming process. The matted material is introduced into a chute 41 which has at its upper entrance a reel (not shown in FIG. 7 or 8 but visible in FIG. 3) which flings the mat against a chute wall to provide, in essence, individual fibers that fall a short distance to a precompacting apparatus 42 to be described in detail below. The inclusion of the precompacting apparatus 42 is a major feature of the instant invention. It is configured and positioned not only to receive the fibrous material but also to provide a preselected volume of the same to a packer 43. In this connection, it is positioned to engage directly or indirectly essentially all of the fibers delivered to the underlying packing apparatus. Packer 43 forces the material downward in front of a reciprocating ram which makes a core for the board by continually adding chevron-shaped "bites" of the fiber to a forming end of the core and forcing such bites and the core through extrusion structure made up of an extrusion chamber 44 and heat and adhesive tables 46. It is noted that what is, in essence, equivalent to the packer of this invention is referred to as a precompactor in the previously identified patent. It is not the same as applicants' recompacting apparatus in that it does not regulate volume. The instant invention includes not only the precompacting apparatus 42 but the packer 43.

Figure 9:
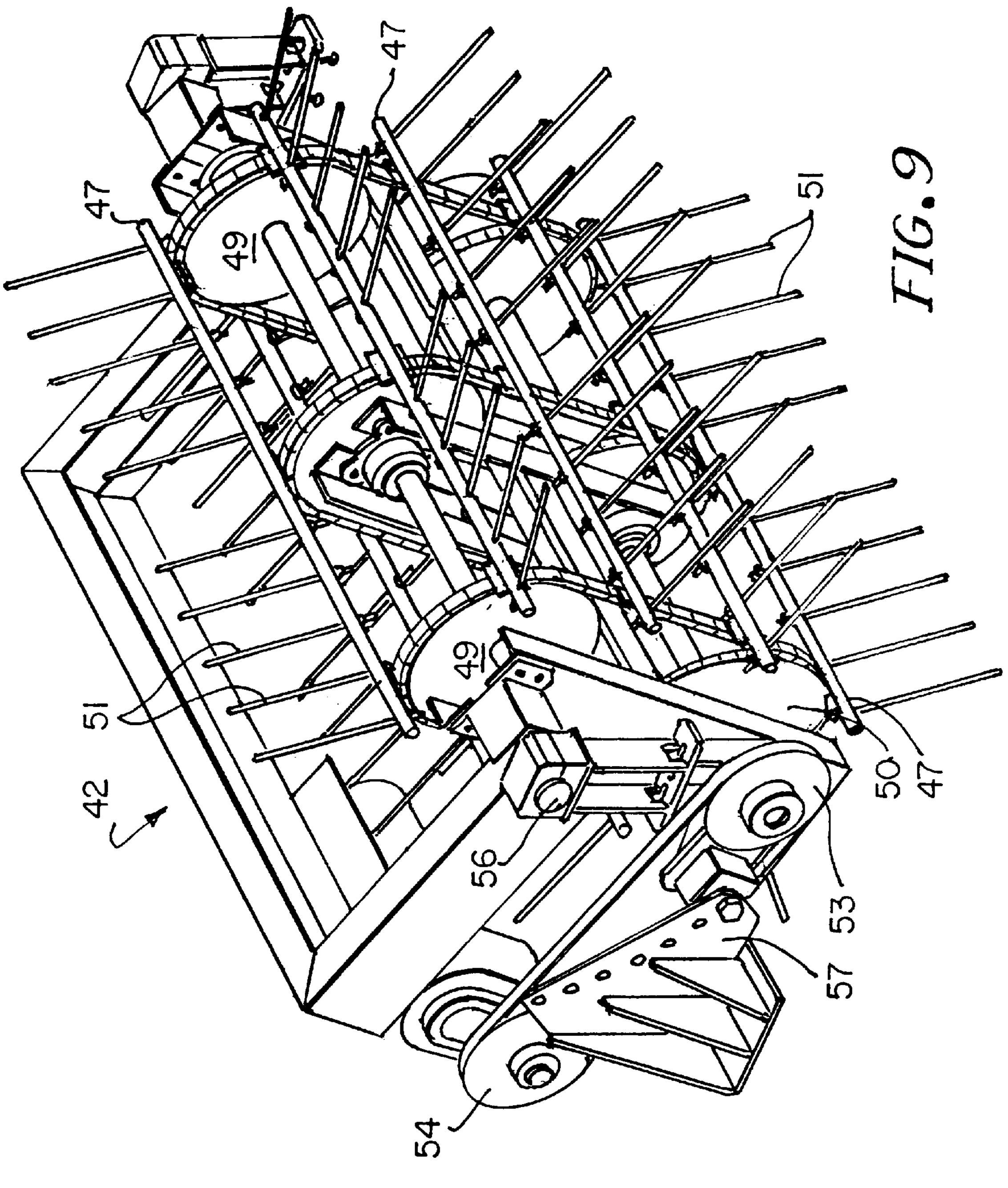
FIG. 9 is an enlarged preferred view of a preferred embodiment of a precompactor of the invention.
Figure 10:
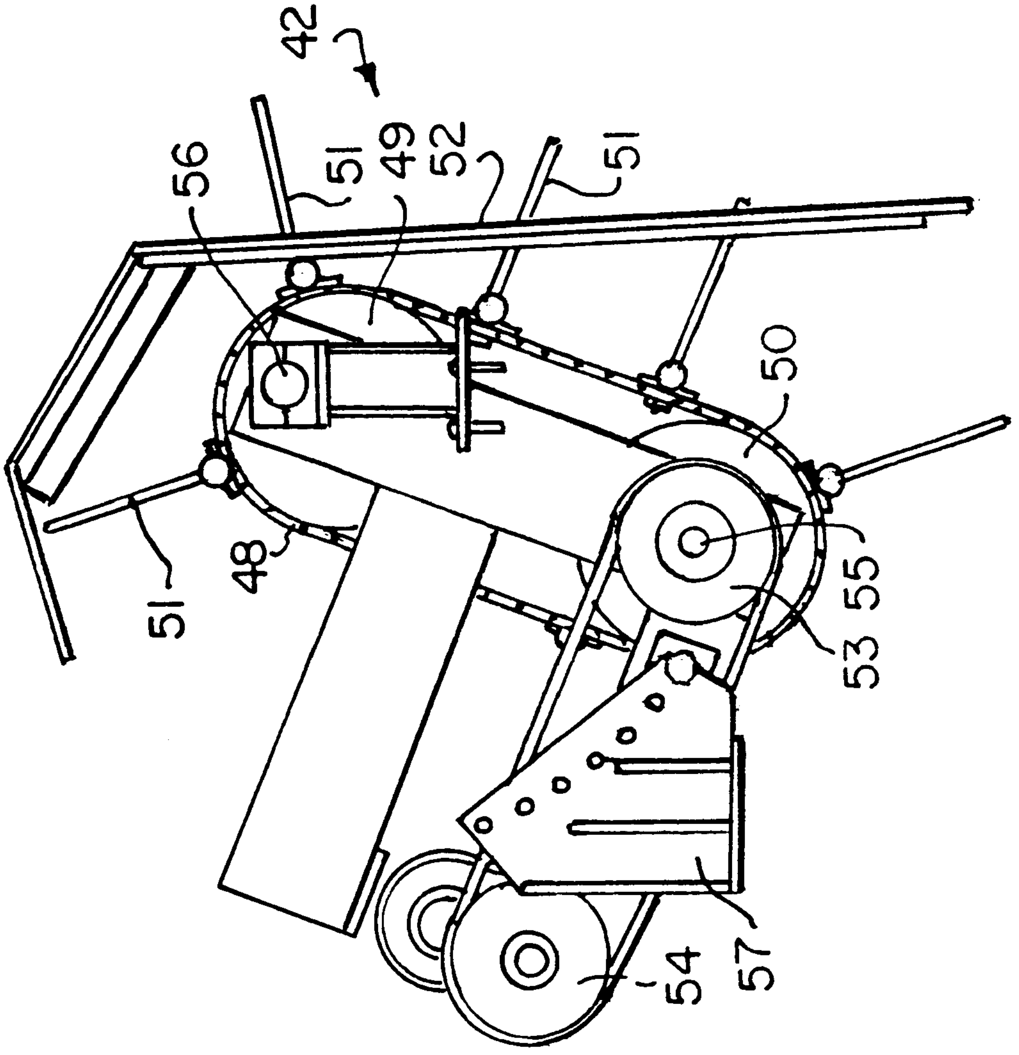
FIG. 10 is a schematic end view of the precompactor shown in FIG. 9.

Reference is made to FIGS. 9 and 10 for a more detailed showing of the precompacting apparatus 42. As illustrated, such apparatus 42 includes a plurality of bars 47 which are mounted transversely of the material flow on, in this implementation, three sprocket chains 48 which individually ride on respective upper and lower sprockets 49 and 50. Each of the bars 47 is mounted rigidly on the chains 48 and has a plurality of fingers 51 mounted lengthwise at spaced-apart locations. These fingers extend through complementary slots in a wall 52 (only shown in FIG. 10) of chute 41 to engage fibers as they fall and deliver a preselected volume of the same to the packer 43. In this connection the speed of rotation of the sprockets 49 and 50, and, hence, the volume of fibers exiting from the apparatus is adjustable. Thus, the axle 55 on which the sprockets 50 are mounted has a belt driven pulley 53 connected to an output pulley 54 on a variable speed motor. Such variable speed motor and its connection to the sprockets and indirect connection to the fingers provides mechanism as a part of the precompactor enabling adjustment of such size of the volume.

While the construction described will assure that the fingers 51 on adjacent bars remain parallel to one another throughout a large portion of their movement, the position of the fingers 51 relative to the slots in wall 52 is adjustable. That is, the whole mechanism can be pivoted for such adjustment about pivot pins 56. (Only one of the pivot pins 56 is shown—it being recognized that the other pin is on the side of the mechanism not illustrated.) The apparatus can be held in a desired position via a bolt extending through a selected hole provided in a flange 57 mounted on the frame of the mill.

As mentioned previously, the fiber stock is compressed with other like-treated fiber stock to make up a board core. The ram includes a ram head to be described in detail below which engages the fiber via a front, chevron-shaped end and provides this compression. While such ram and its head will be discussed below, before the ram engages the fiber stock, such stock is forced into position in front of the ram by packer 43. In this connection, the packer is designed to force the fiber stock to adjacent the conveyor, as well as throughout the height of the ram so that the density of the core being formed is generally uniform throughout its thickness and width.

Figure 11:
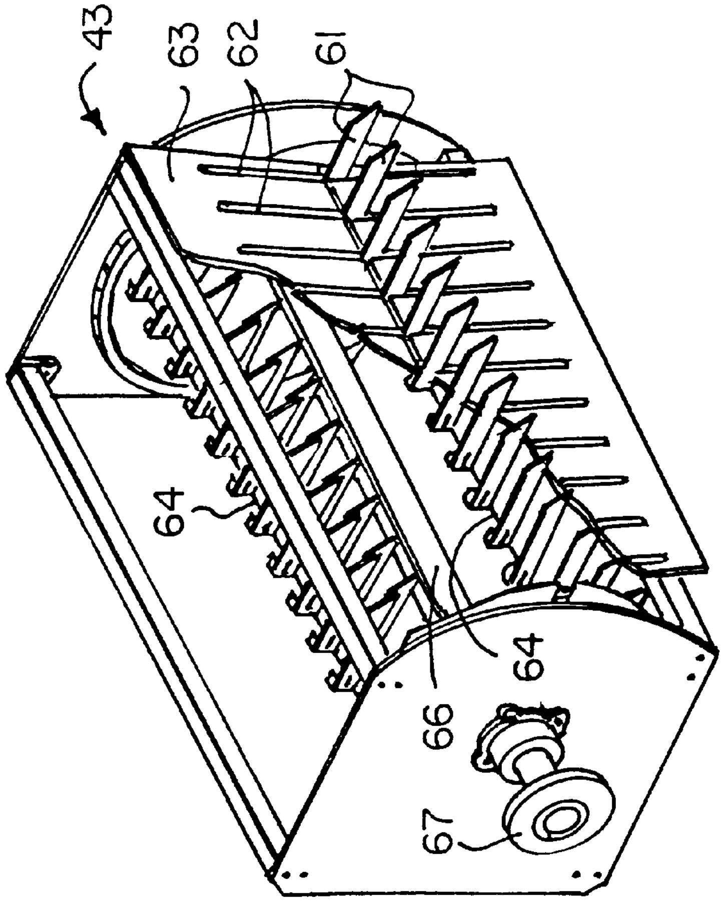
FIG. 11 is a pictorial view of a timed packer incorporated in the invention.

Packer 43 includes a plurality of prongs 61 (FIG. 11) which extend through complementary slots 62 in a wall 63 of the hopper 41. As illustrated, the prongs 61 are mounted on bars 64, which in turn ride in eccentric races (not shown in detail) so that the prongs 61 are maintained in a set angular position relative to the slot 62 as they traverse the same upon rotation of packer axle 66. A sprocket 67 on the end of the axle is connected via a chain (not shown) to the main drive shaft responsible for movement of the ram, so that the motion of the packer prongs is synchronized with the motion of the ram. This synchronization is achieved to enable the timed packer to force fiber into the space in front of the ram before such ram moves forward. In the illustrated implementation, there are four rotating bar 64 and prong 61 sets, and the speed of rotation of axle 66 can be changed by changing the sprocket 67 so as to vary the amount of fiber forced into the path of the ram head.

Figure 12:
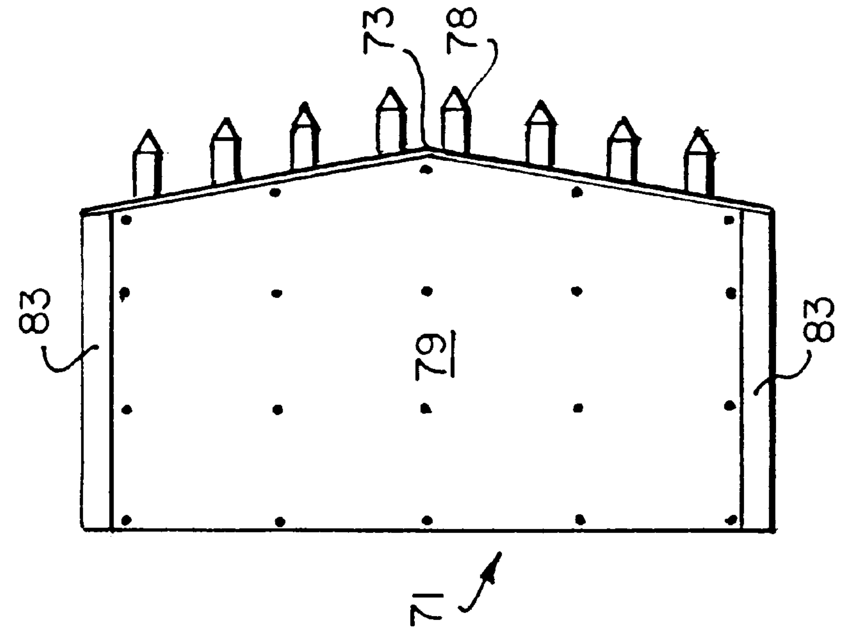
FIG. 12 is a plan view of a ram head incorporated into the preferred embodiment of the invention.
Figure 13:
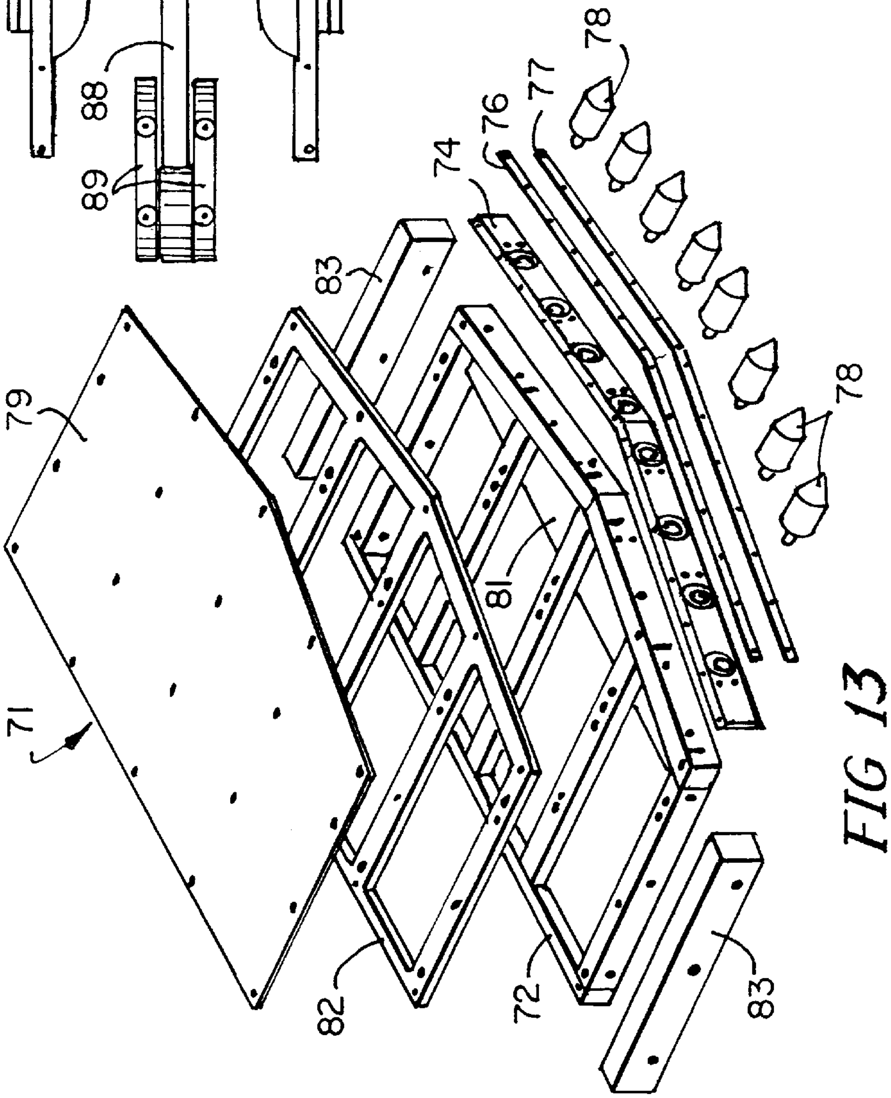
FIG. 13 is an exploded pictorial view of the ram head of FIG. 12.

The ram head itself is generally referred to in FIGS. 12 and 13 by the reference numeral 71. It is modular and includes an interior base or main module 72 which defines its general configuration. In this connection, as is shown, the front or nose 73 of the ram head is generally chevron-shaped. Such nose includes a replaceable front wear plate 74 having, as is illustrated, upper and lower edge inserts 76 and 77. These inserts are made of a high wear material and the upper edge insert cooperates with a knife blade (to be described) to shear off fiber to be added by the ram head to a core being formed. The bottom edge of the ram head also is a major wear point as the ram head reciprocates.

It is to be noted that each of the high wear resistant edge inserts can be rotated four times to present a new edge to cooperate with a knife blade and to protect the lower portion of the ram head. Also each of the inserts 76 and 77 is in two pieces which meet at the apex of the chevron-shaped front 73.

The front of the ram head further includes a plurality of pointed projections 78 which form holes through the portion of the fiber being compressed at the forming end of the core. These holes register with holes in previous fiber "bites" making up the core so as to provide core holes 79 (FIG. 1) extending throughout the length of the core. These core holes are provided in the center of the core for use as raceways for, for example, electrical wiring or plumbing. They also are usable during the formation of the core to introduce a fluid, such as heated air, to the center of the core. The number of these projections can be varied depending upon the number of core holes it is desired. In this connection, it is to be noted that the projections 78 terminate in bolts which fit within registering holes in the nose piece, and the number originally provided simply can be varied downward by removing one or more of such projections.

The head 71 also includes a top wear plate 79. It is such wear plate that comes into contact with the fibers which are not added to the core. Such wear plate is replaceable and protects much of the remainder of the ram head, including the base module 72. It is to be noted that the bottom portion of the head is not subjected to wear and thus simply includes a webbing 81.

In accordance with the invention, the ram head is configured to enable easy and quick size adjustments. Thus it includes a spacer 82 sandwiched between the base module 72 and wear plate 79. It will be recognized that one can simply change such spacer 82 to vary the height dimension of the head. The location of the base module need not be changed. A different nose piece 74 can be provided having a height correlated to the changed height of the ram head. The ram head also includes end blocks 83 which easily can be changed to vary the width of such head.

Figure 8:
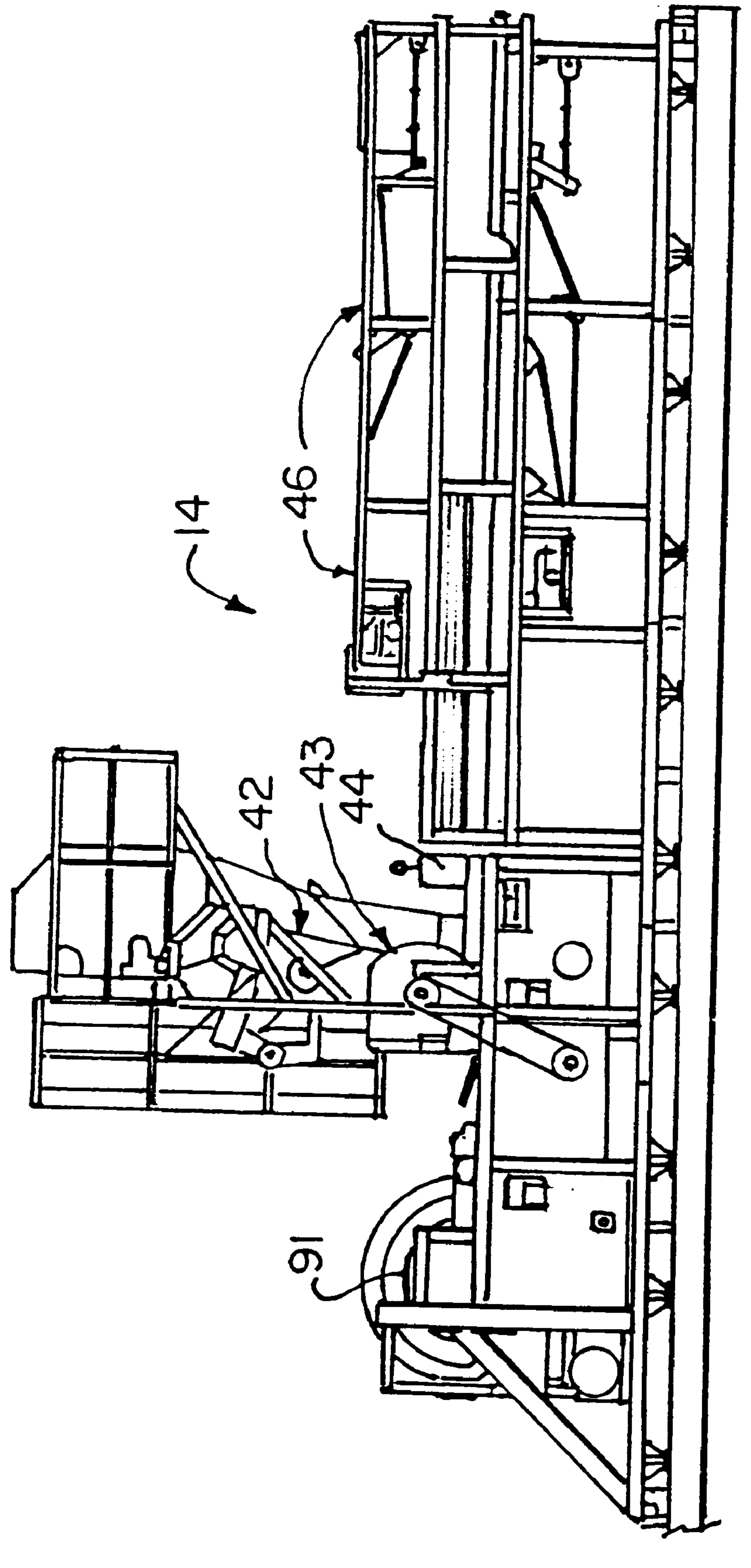
FIG. 8 is a side elevation view of the part of the production mill illustrated in FIG. 7.
Figure 14:
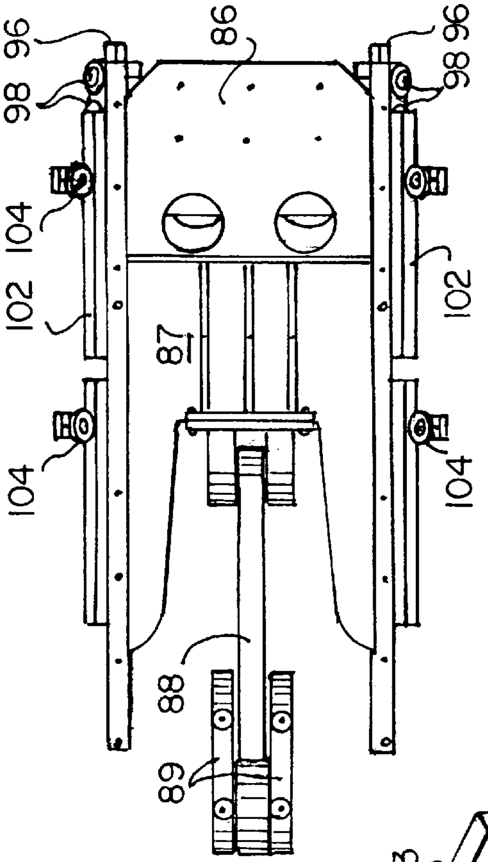
FIG. 14 is a plan view of the ram support.
Figure 15:
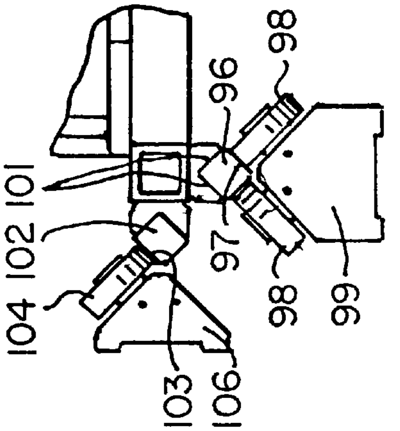
FIG. 15 is an enlarged partial view of the portion of the support encircled by the line 15—15 in FIG. 14.

As mentioned previously, the ram head reciprocates to compress fiber into the forming end of a core. FIGS. 14 and 15 illustrate a support for the ram head. The ram head (not shown in such figures) is mounted rigidly to a plate 86. This plate 86 is part of a slide 87 mounted for reciprocal motion by means of a connecting rod 88 extending from a crank connection 89 which, in accordance with conventional practice, is connected to a drive flywheel 91 (FIG. 8).

It will be recognized that when the ram head is mounted on the oscillating support for back and forth motion and engagement with the fiber stock, the combination is quite heavy. A suspension arrangement is included for the ram which has several new features. It is designed to define the path of movement and carry the load from the bottom, with access for adjustments through openings in the sides of the frame (not shown). That is, a pair of guide rails 96 are mounted on the opposed sides of the support. As illustrated, each of such guide rails is generally square in section and presents two downwardly facing guide surfaces 97 (FIG. 15) in engagement with follower bearings 98 mounted for rotation on bottom mounting blocks 99. In the specific implementation being described, each block 99 is mounted on the apparatus frame and supports four bearings 98, only two of which are shown in FIG. 15—the other two being hidden by the two shown. There are two of such blocks supporting each guide rail, spaced apart from one another. It will be recognized that from the broad standpoint the location of the guide rails and the follower bearings can be reversed, i.e., the follower bearings can be provided on the moving ram whereas the guide rails can be mounted on the frame.

It will be recognized that the height at which each of the blocks 99 supports associated bearings is adjustable simply by including shims (not shown) or the like between the block and its mounting on the frame. This height is adjustable not only to adjust the height at which the ram support travels on its path, but also to take up wear caused on the guide rail bearing surfaces 97 due to the continual back and forth motion of the heavy ram structure. Because each of the guide rails is square, it also provides a pair of bearing surfaces 101 which is not in engagement with the bearings 98 but can be brought into engagement in place of the bearing surfaces 97 simply by rotating the guide rail through 180°. Although FIG. 15 only shows one of the bottom support structures, it will be appreciated that the others that are included are identical to the one illustrated.

The ram suspension system also includes means for prohibiting sideways motion. That is, a pair of side guide rails 102 are provided on opposed sides of the ram extending along its desired direction of movement. As can be seen in FIG. 15, each of such side rails 102 provides a bearing surface 103 which rides between a plurality (in this case four) of follower bearings 104. These side cam bearings engage the side rails at a 45° angle as illustrated, and allow for side to side adjustment. In this connection, each of the follower bearings 104 is mounted on a bearing block 106 which can be adjusted horizontally relative to the apparatus via shims or the like positioned between it and the frame to which it is attached. The side rails 102 are also square in cross section and present, as it will be seen, four different bearing surfaces which can be used before wear requires side rail replacement. Again, from the broad standpoint the location of the side guide rails and side cam bearings can be reversed.

The ram head reciprocates into and out of the extrusion chamber 44. When it moves into the chamber it compresses fiber stock at the forming end of the core, whereas when it moves back it enables the packer 43 to place more stock in front of it. The entrance end of the chamber 44 includes a knife blade 110 which cooperates with the top edge insert 76 at the front of the ram to shear off fiber stock. It does this each time the ram goes forward to compress fiber at the forming end of the core. The dimensions of core formed are defined by wear plates 111 mounted on a space bolster plate 112, side blocks 113 supporting machine profiled block wear plates 114, and top wear plates 116. A relatively massive plate support structure 117 for the upper portion of the chamber is also included.

Figure 16:
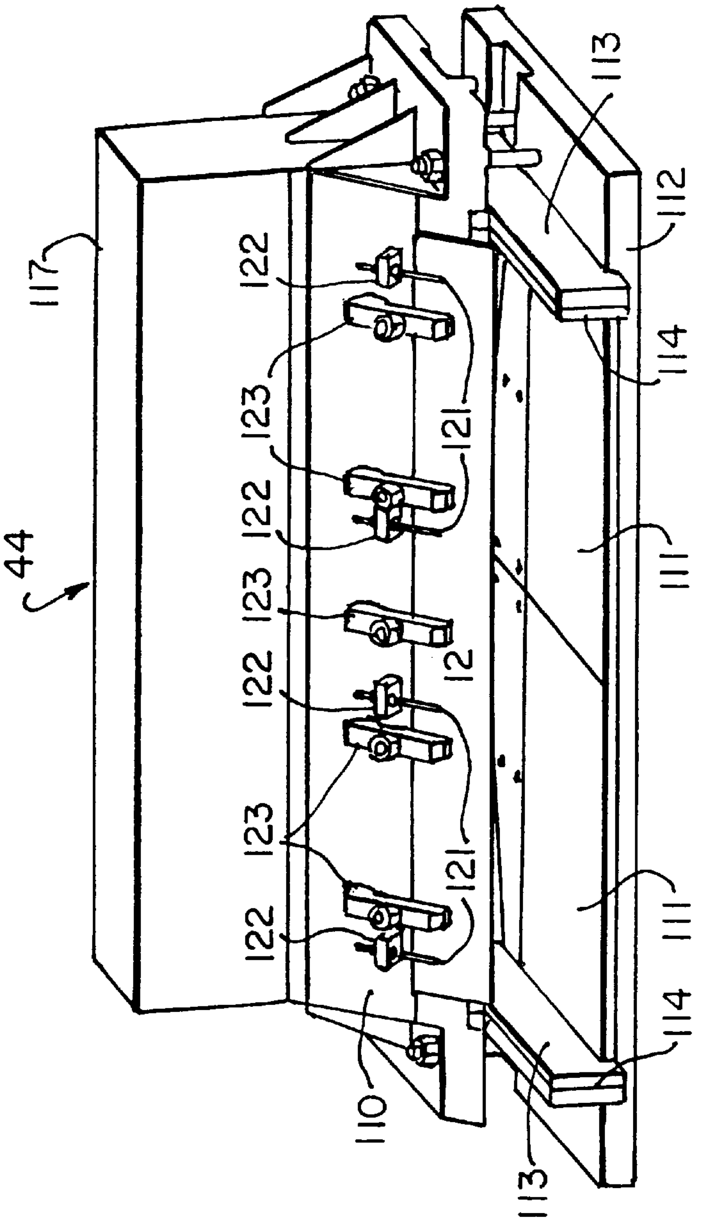
FIG. 16 is a pictorial view of an extrusion chamber and knife blade aspect of the preferred embodiment of the present invention.

As illustrated in FIG. 16, the knife blade 110 is mounted angularly on the chamber. That is it is mounted via threaded rods 121 which pass threadably through blocks 122 projecting from a wall of the chamber. Clamps 123 are also provided to inhibit movement of the knife blade beyond a set location.

Figure 17:
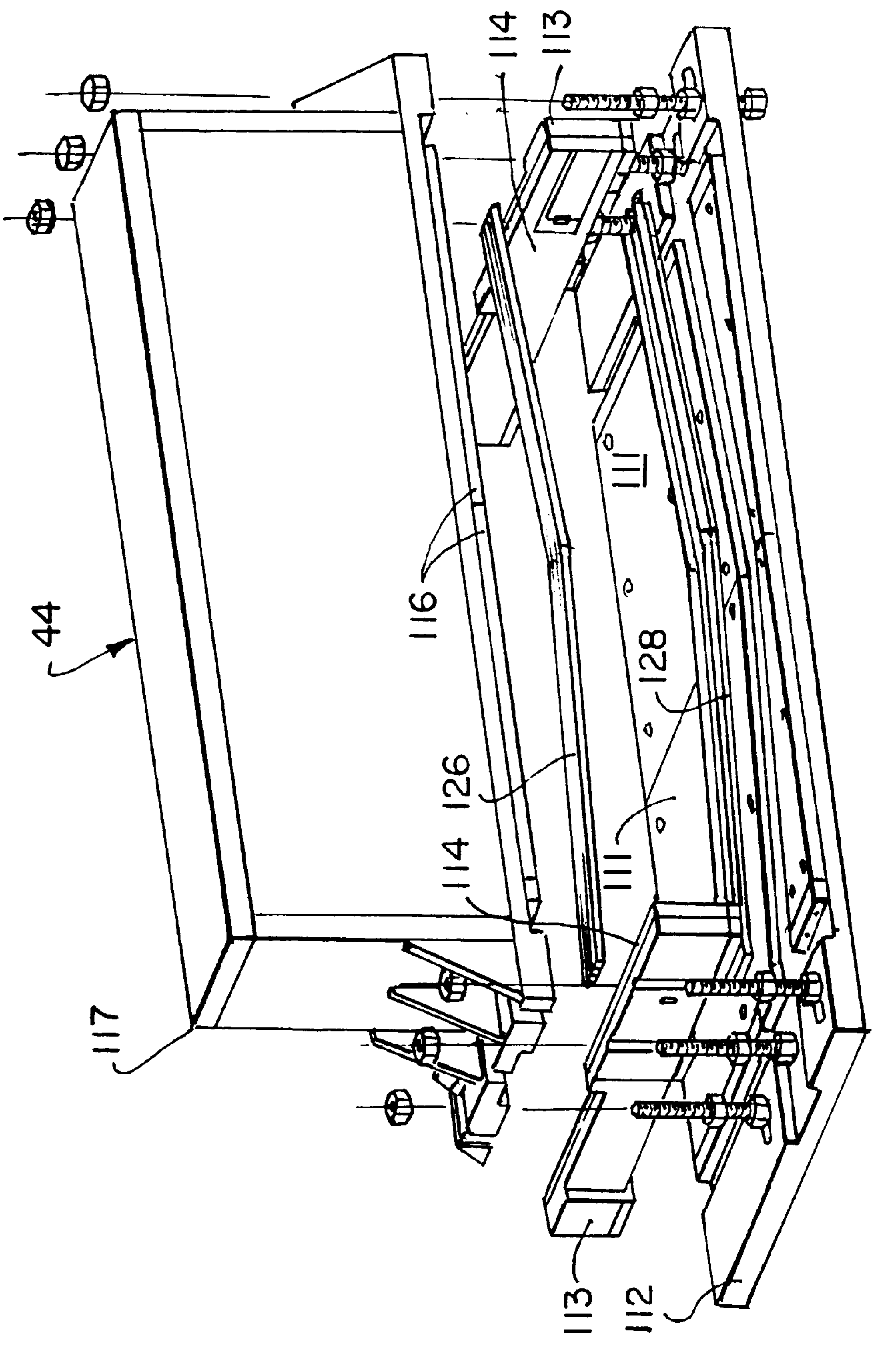
FIG. 17 is an enlarged front pictorial view of the extrusion chamber of FIG. 16.

In accordance with conventional practice, the extrusion chamber 44 includes a plurality of gill plates 126 (FIG. 17) for preventing fiber stock that is compressed by the ram from following such ram in the backward portion of its compression stroke. The manner in which such gill plates are mounted, though, is not conventional. This manner assures that they easily can be removed and replaced as necessary. In this connection, it will be recognized that such gill plates represent an area of relatively great wear during operation.

Figure 19:
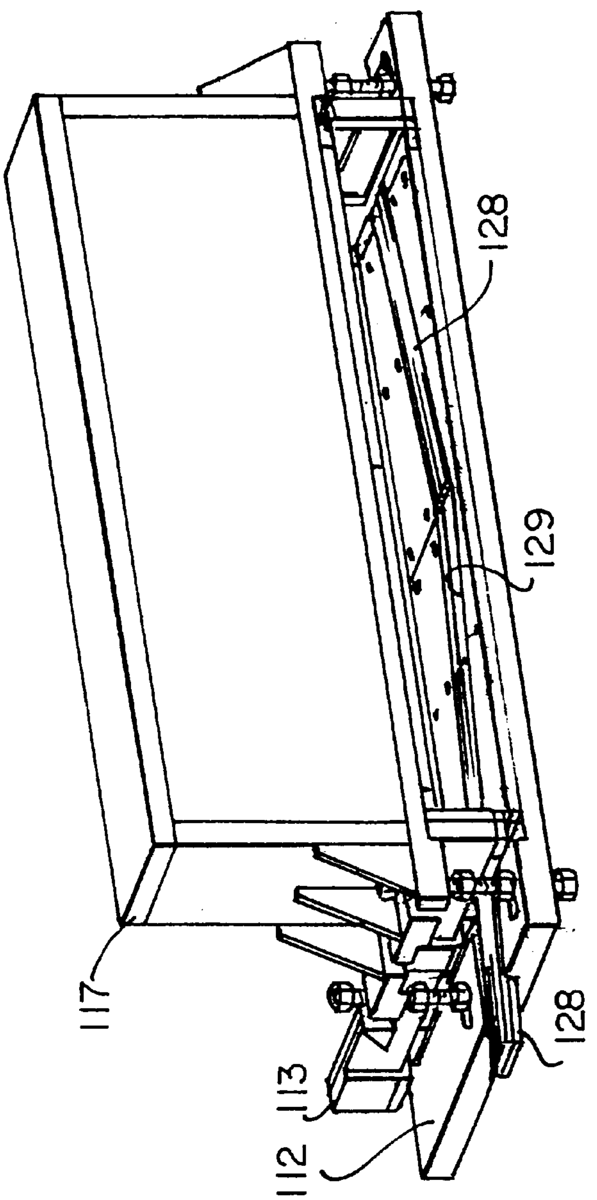
FIG. 19 is another front pictorial view of the chamber of FIG. 17, highlighting a feature of the invention.
Figure 18:
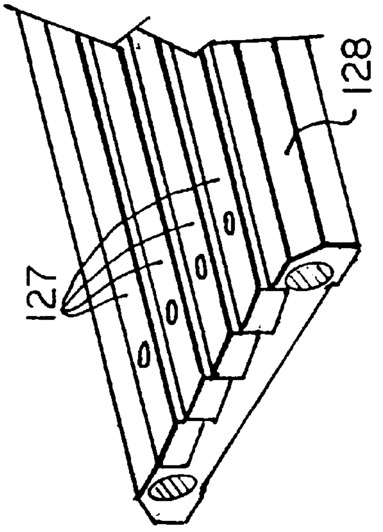
FIG. 18 is an enlarged partial view of a portion of the extrusion chamber.
Figure 20:
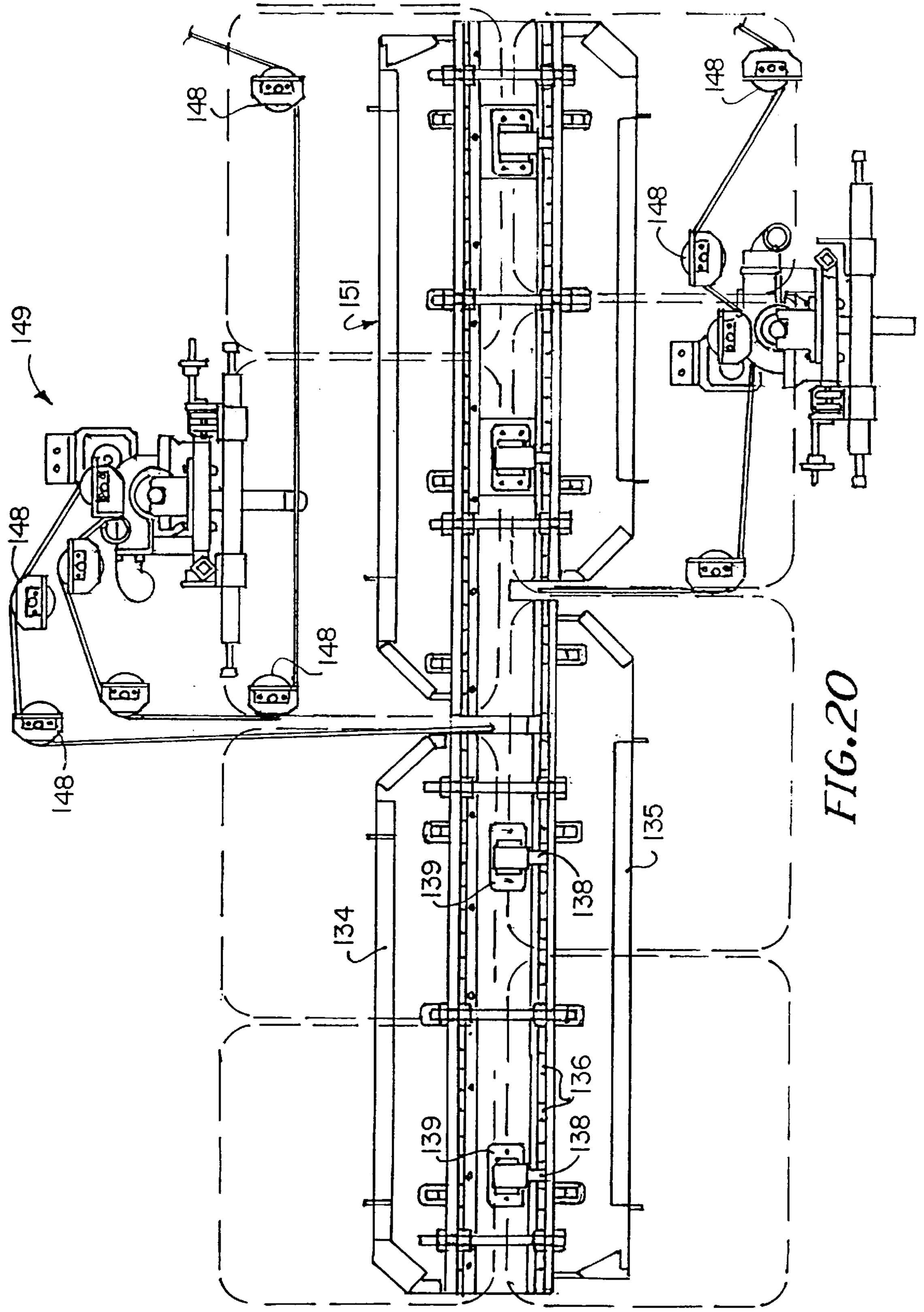
FIG. 20 is a side view of an extrusion structure of the invention illustrating other features of the invention.

As can be seen from FIGS. 18 and 19, the gill plates are straight rods meeting at the center of the unit to provide a chevron shape matching that of the front end of the ram. There are four of such rods 127 in each half (see FIG. 18). Each set of rods are mounted in a base plate mounted within a reentrant slot 129 in the base or bolster plate 112 in a manner which enables quick release for removal. That is, each gill rod base plate slidably engages the bolster plate.

A core being formed is passed from the extrusion chamber to the extrusion heat and adhesive tables 46. These tables are shown in detail in FIGS. 20–23. Each table includes a support plate 131 (see FIG. 21), a pair of opposed side blocks 132 and a top plate 133. Each table also includes upper and lower hoods respectively denoted by the reference numerals 134 and 135. Moreover, each includes both below the support plate 131 and above top plate 133, a plurality of strip heaters separated by spacers 136.

Figure 21:
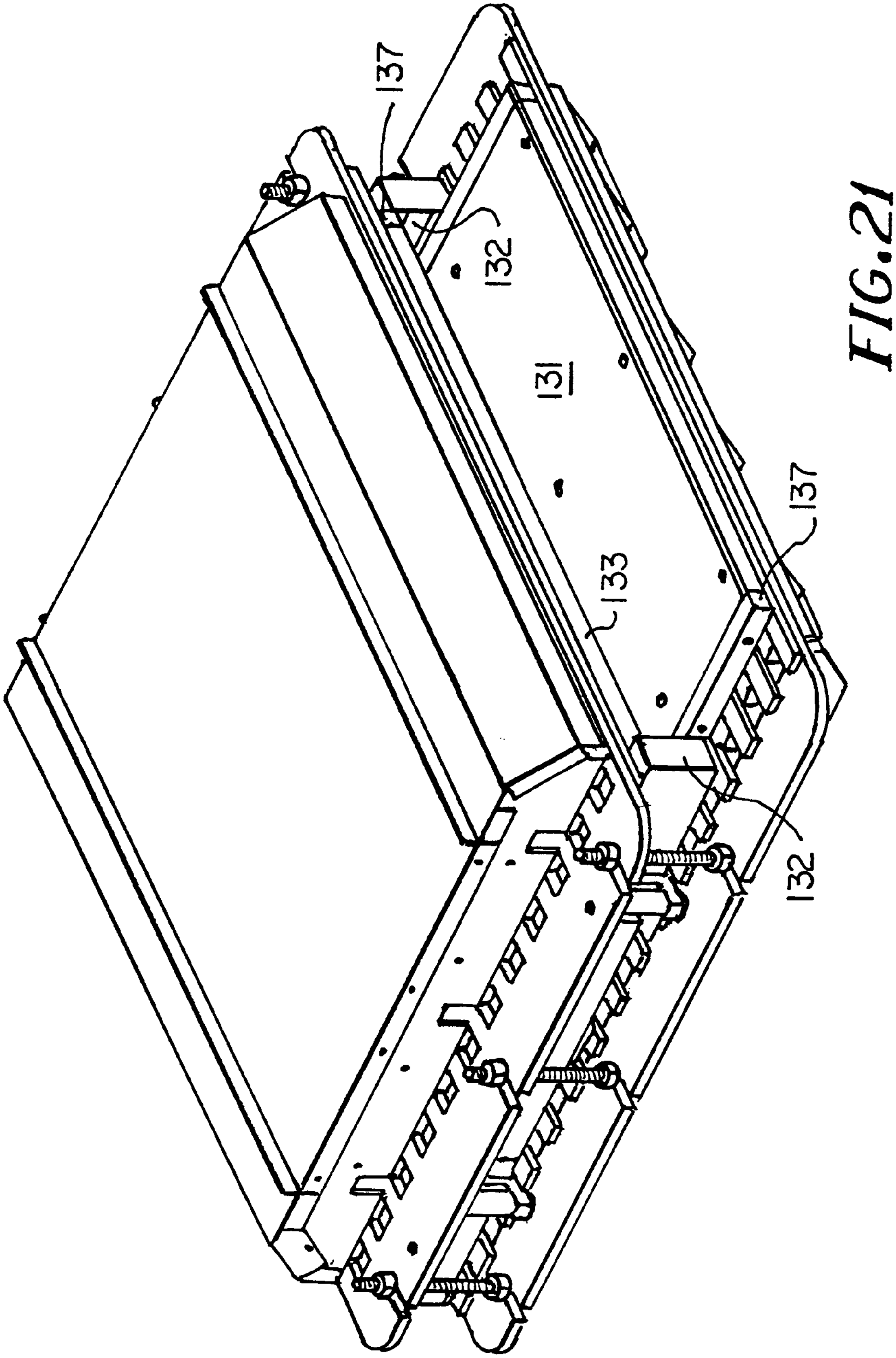
FIG. 21 is a pictorial view of a portion of the extrusion structure of FIG. 20.

In keeping with the invention, the extrusion dimensions of each of the tables 46 is easily adjustable. As illustrated in FIG. 21, the support plate 131 and the top plate 133 of each includes a pair of opposed side blocks 137. These blocks simply can be replaced to enable the horizontal width of a core being formed to be varied. The side blocks 132 define the height of the core and also can be replaced as appropriate. In this connection, each of the side blocks 132 is held in position by a pair of eccentric cam pins 138 extending into appropriate straps 139. It will be seen that rotation of the pins 138 not only will facilitate removal of their associated side block, it will also enable the side block positioning horizontally to be adjusted as appropriate for different width of core. The upper and lower heat assemblies of each table are also easily disassembled from one another without losing a selected height adjustment. To this end, while in the past such assemblies have been simply bolted together, in this invention slots 141 are provided for threaded bolts 142. It will be easily seen by simple analysis in FIG. 20 that to disassemble the upper and lower heat assemblies it is only necessary to loosen one or both of the exterior nuts on the threaded rods. The interior nuts can be left in place to precisely define a selected distance between the assemblies.

Figure 23:
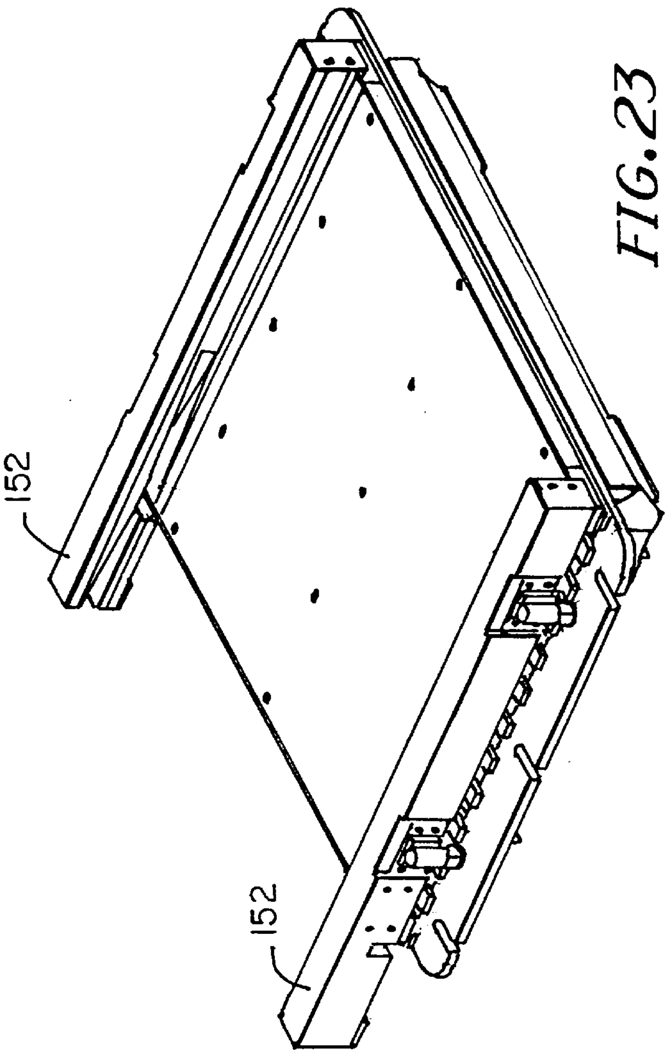
FIG. 23 shows another portion of the extrusion structure of the preferred embodiment of the invention.
Figure 22:
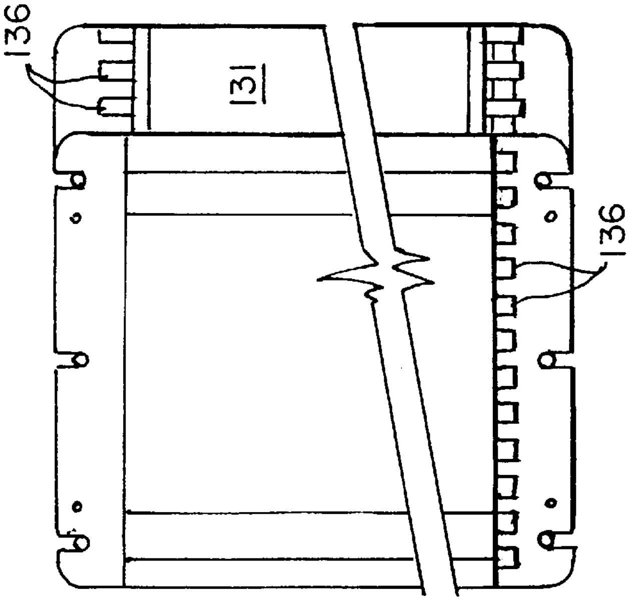
FIG. 22 is a broken plan view of the portion of the extrusion structure illustrated in FIG. 21.

The core being formed passes through the extrusion table before passing through the adhesive table. It is heated as appropriate in the heat table (via zones as will be described) and then the adhesive table is used to adhere heavyweight paper stock to the top and bottom surfaces of the core. In an implementation of the invention the paper stock was 69 lb. kraft liner board, with roll 146 and 147 (FIG. 3) of the same being furnished. Paper from roll 146 is fed via various idler pulleys 148 through an adhesive applicator 149, to be discussed in detail below, before passing between the heat and adhesive tables to be applied to the upper surface of the core. Paper from roll 147 is also fed via appropriate idler rollers 148 through an identical adhesive applicator 149 and then is directed to the bottom surface of the core. In this connection, it is to be noted that a liner board stock is introduced into the core forming line between the extrusion heat and adhesive tables. The adhesive table, generally referred to by the reference numeral 151, essentially is the same as the heat table except that the upper and lower portions of the same are reversed. That is, the upper hood 134 of the adhesive table corresponds to the lower hood 135 of the extrusion heat table whereas the lower hood 135 corresponds to the upper hood 134 of the heat table. The upper and lower heating assemblies of the adhesive table are similarly reversed. The side blocks 152 of the adhesive table also differ somewhat from the side blocks 132 of the extrusion heat tables. That is, the side blocks 152 also include conventional side paper folding configuration as is illustrated in FIG. 23.

Figure 24:
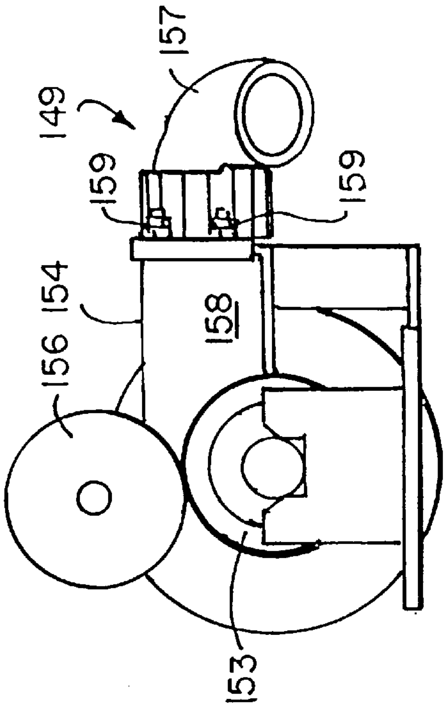
FIG. 24 is an end view of an adhesive applicator incorporated into the preferred embodiment.
Figure 25:
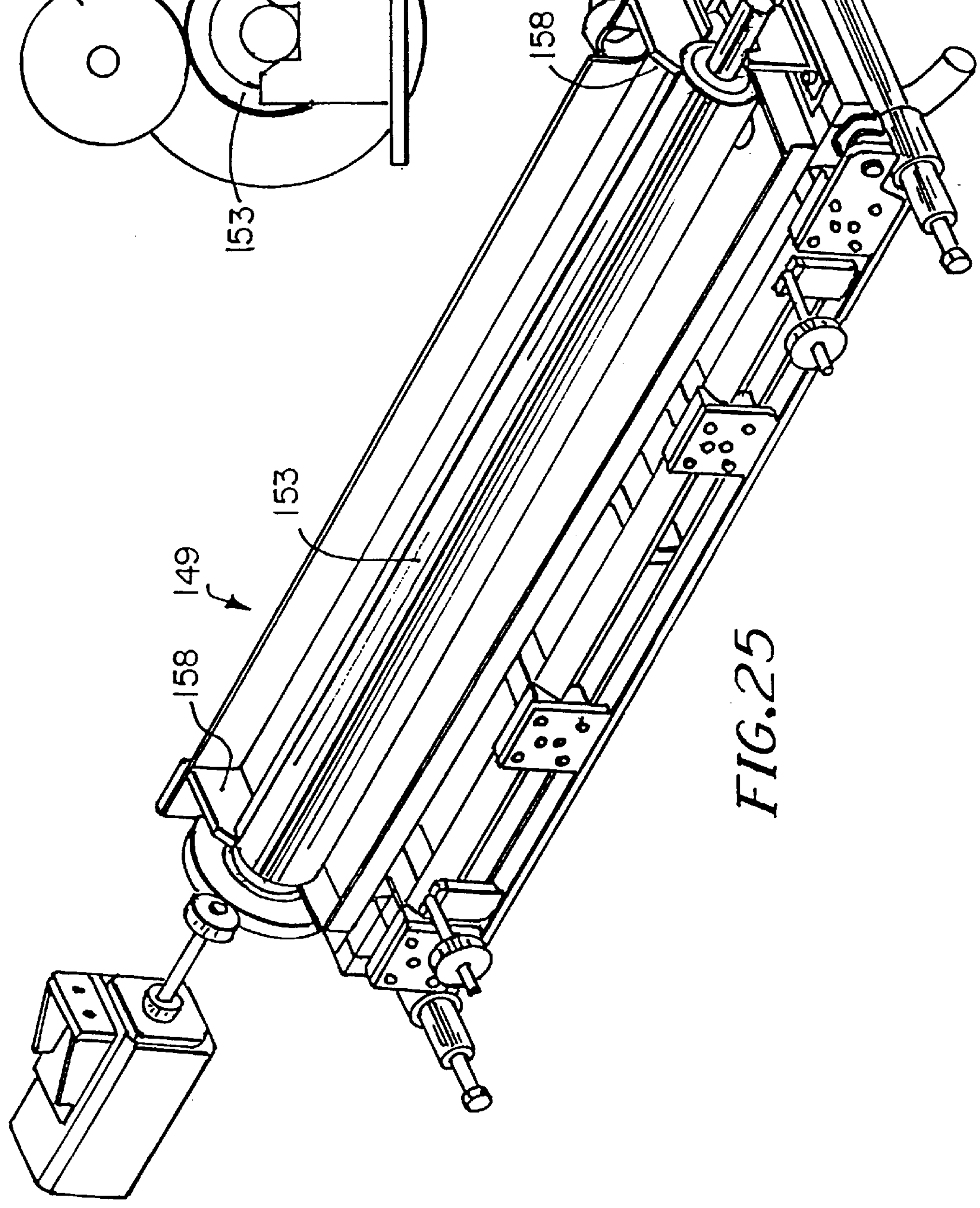
FIG. 25 is a pictorial view of the adhesive applicator of FIG. 24.

One of the adhesive applicators 149 is shown in some detail in FIGS. 24 and 25. Such adhesive applicator is conventional except that the width of the adhesive applied to the liner board is adjustable. This is important in view of the varying width and thickness of board that can be produced with the apparatus. The glue application roller 153 picks up glue from trough 154 and such glue is then applied to a surface of the liner board by such liner board being passed between the glue roller 153 and a glue idler roller 156. Elbow 157 is an overflow drain for the trough 154.

The sides of the trough 154 are provided by plates 158. These plates are held in position by threaded studs 159. Such studs extend through slots (not shown) so that the position of such plates inwardly and outwardly of the remainder of the trough is easily adjustable. Adjustment of the width of the trough 154 will provide the desired adjustment of the width of the adhesive that is applied.

Figure 26:
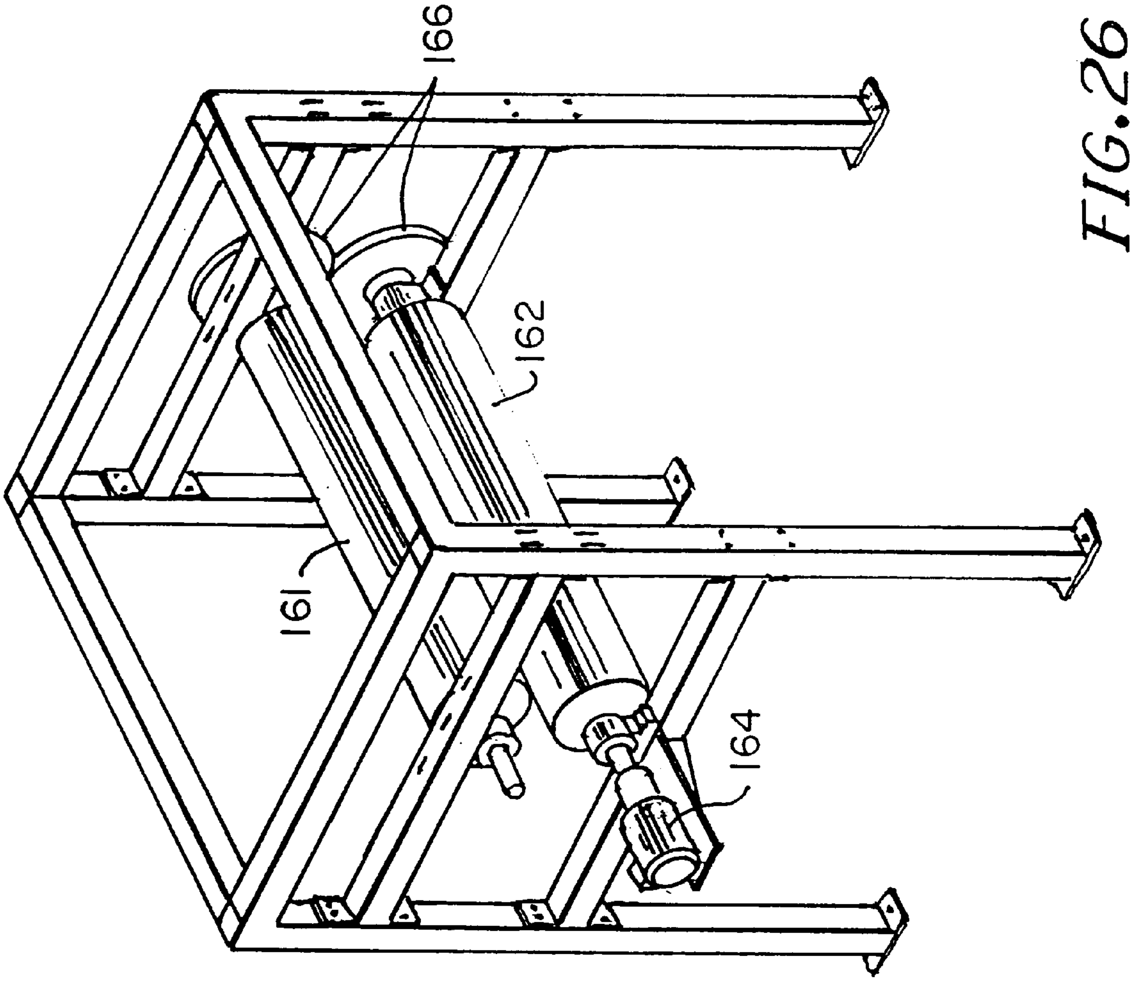
FIG. 26 is a pictorial view of an extrusion pressure offset arrangement incorporated into the preferred embodiment of the invention.

It will be recognized that as the ram head oscillates, it will vary both the extrusion pressure on the board significantly and the speed of movement of the board through the mill. As one feature of the instant invention, it includes a mechanism for offsetting the pressure. That is, with reference to FIG. 26, an offset pressure mechanism is provided in the board forming line. It includes a pair of rollers 161 and 162, between which the core (with paper lining its exterior sides) is passed. These rollers are each provided with rubber surfaces to provide a high degree of friction with the board as it passes through the same. A hydraulic/pneumatic drive 164 is provided for rotating roller 162, and sprockets 166 conventionally connected by a chain (not shown) transmits motive power of roller 162 to roller 161. In an implementation of the instant invention, a board density of about 15 lbs. per cu.ft. is targeted.

As will be discussed, the rotation force on the rollers is determined by analysis of the extrusion force of the ram, registered by a load cell near the ram body. It will be recognized that while in this implementation the offset rollers provide a pulling offsetting force (a tensile force), it is contemplated that in some situations it may be better to provide a resistive force, i.e., the rollers being rotated to provide a surface speed which is lower than the surface speed of the core before passing between the same.

Figure 27:
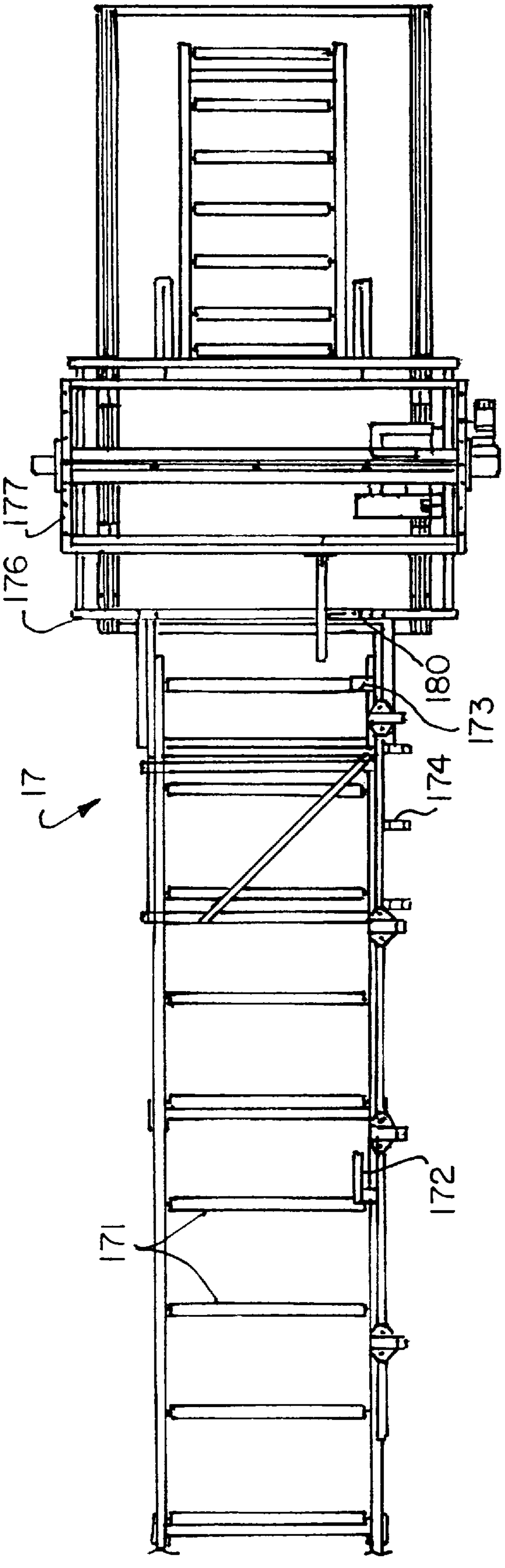
FIG. 27 is a schematic elevation view of the cut-off saw aspects of the preferred embodiment.

It is common to cut a core into appropriate lengths for the board. For this purpose, a saw system is typically provided. In accordance with this invention, a saw system is provided having a dual carriage arrangement to assure precise cutting locations. FIG. 27 is a plan view of such saw arrangement, which arrangement is represented both in FIG. 3 and FIG. 27 by the reference numeral 17. The conveyor for the core as it travels through the saw is provided by free wheeling conveyor rollers 171. As the core moves past it, a pneumatic stapler gun 172 shoots a staple into such core. This staple is flush with the surface of the core and is detected by a sensor 173 as it and the core portion of which it is a part passes by the same. Such sensor activates a time delay which is adjustable depending upon the speed of movement of the core and length desired. At the end of the delay a clamping system represented by clamps 174 so that the entire saw arrangement will travel with the core.

The clamping system 174 is a part of a primary saw carriage 176. One of the problems with cutting a core into precise board lengths in the past has been caused by the fact that the speed of movement of the board through the mill is not uniform. This means that the position at which the saw arrangement is clamped to the core and, hence, the core is cut, has not been precise. As mentioned previously, the saw carriage of this invention is a dual carriage. Besides the primary carriage there is a secondary carriage as represented at 177. The saw itself is on the secondary carriage. This secondary carriage moves relative to the primary carriage to locate the saw in a precise cutting position. There are actually two saw blades, one above and one below the core, which blades are slightly offset from one another so as not to engage.

When the primary saw carriage 176 is clamped on the core to travel with the same, the secondary saw carriage 177 moves in the forward direction relative to the primary saw carriage. Such secondary carriage includes a sensor 180 for sensing the staple. This sensing causes the secondary carriage 177 to clamp itself into position on the primary carriage 176 and shoot another staple into the board. The upper and lower saws on the carriage are moved into operating position and perform their cross cuts, i.e., cut across the core at the desired location. Suitable means, such as a limit switch at the end of the saw travel, deactivates the clamp 174 and the clamp of the secondary carriage to the primary, and moves the saws to clearance and then start-up positions. The two saw carriages 176 and 177 are returned to their starting positions.

Figure 28:
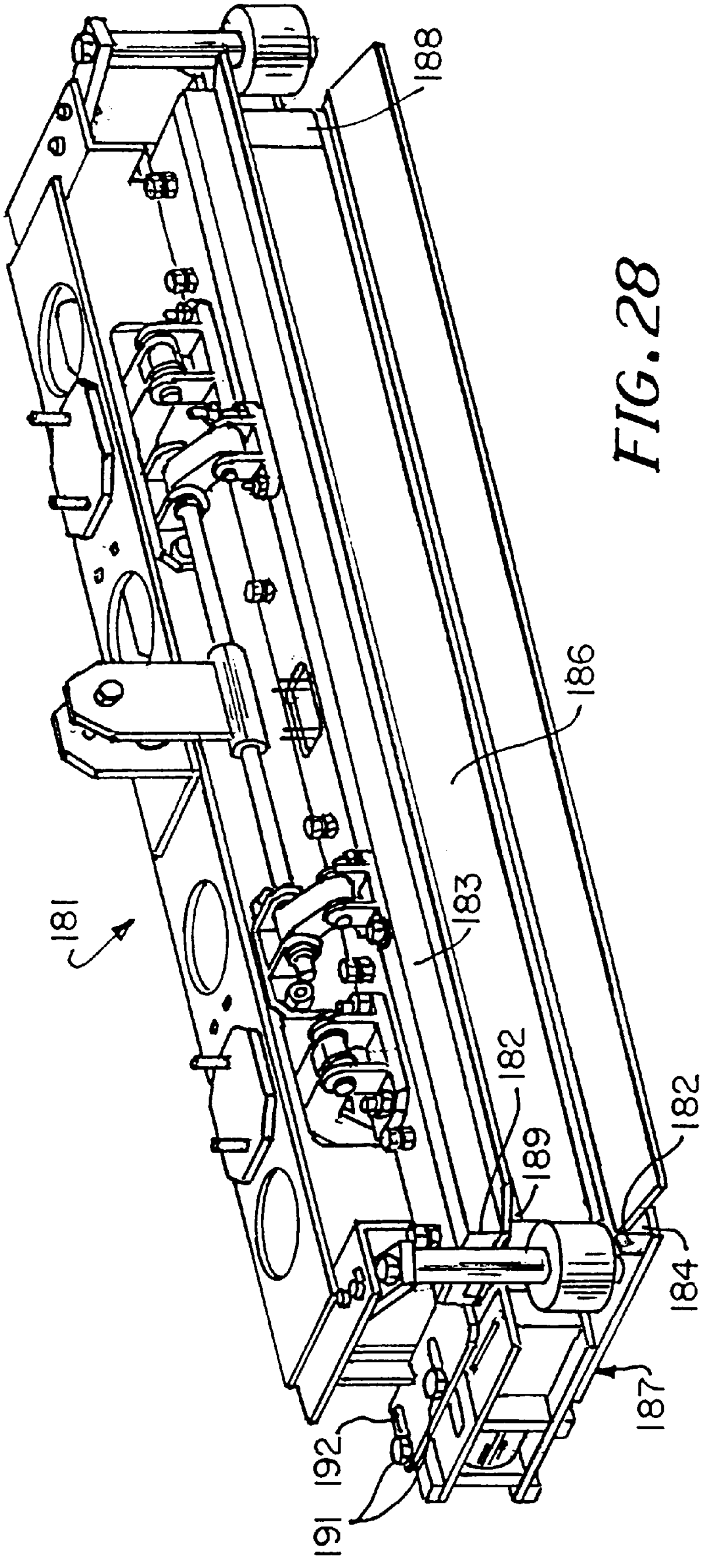
FIG. 28 is an enlarged partial view of an end seal arrangement incorporated into the preferred embodiment of the invention.

Once the core is cut into appropriate lengths, paper end caps are provided as is generally conventional to complete formation of a board which is predominantly made of the agricultural waste products. Two similar die assemblies are provided for this purpose, one for each end cut. FIG. 28 illustrates one of such end cap die assemblies included as part of the preferred embodiment of the invention. Such arrangement, generally referred to by the reference numeral 181 in FIG. 28, is moved into position at an end of the cut board. (The similar die assembly is a mirror image of that being described, and is moved into position at the other end of the cut board.) A paper end cap is held in position along the length of the arrangement by a pair of slots 182. The end of the core is introduced between the jaws 183 and 184 having the slots 182 and which, in accordance with conventional practice, clamp the unit with the paper in position. A movable elongated back plate 186 is then brought into engagement with the paper covered end of the core to adhere the paper in position. In this connection, such movable back plate is heated via heating elements to provide heat, as well as pressure, to provide the desired sealing. A side folder arrangement, generally referred to by the reference numeral 187, is moved into position and performs the side folding operation as is common.

As described to this point, the end cap sealing arrangement is generally conventional. However, the specific arrangement utilized with the preferred embodiment of the invention has been designed to accommodate various thicknesses and width of board. In this connection, the back plate 186 terminates at its sides in opposed end blocks 188 (only one of which is visible in FIG. 28) and an interchangeable top block 189. The location of the side folder arrangements 187 is also adjustable. In this connection as is illustrated each is mounted to the remainder of the apparatus via a pair of bolts 191 which extend through slots 192 so that the position of such apparatus relative to the remainder of the enfolding arrangement easily is adjustable inwardly or outwardly.

It will be recognized that the side folding apparatus of the end cap arrangement not shown in FIG. 28, is the same as that illustrated. Moreover, FIG. 28 includes many engineering details which are very specific but do not need to be understood to understand the principles and details of the invention.

Figure 29:
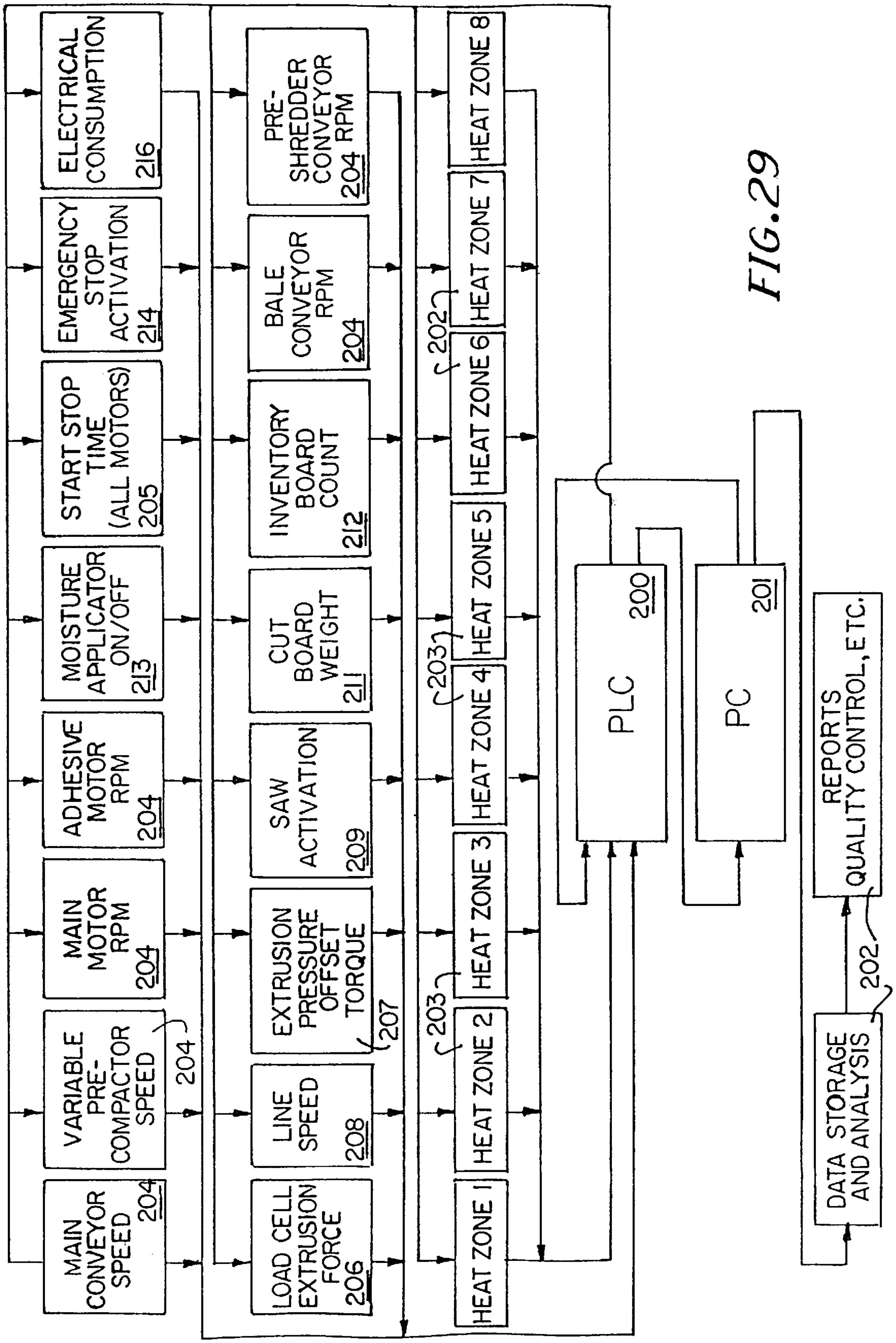
FIG. 29 is a flow diagram illustrating sensing and control of various tasks performed by the preferred embodiment of the invention.

As mentioned previously, one feature of the invention relates to the manner in which the apparatus is controlled. FIG. 29 provides a simplified flow chart. A programmable logic controller (PLC) referred to by the reference numeral 200 receives information and controls the operation. Information it receives is downloaded at regular intervals to a computer represented by box 201, which information is analyzed, printed out as required and stored as is represented by boxes 202. In this connection, because of the common factor of time, the extrusion pressure, etc., on a given board will be known. Moreover, particular properties, such as density, can be determined for future settings.

One major feature of this invention is that it controls independently the heating provided by various parts of the heat extrusion and adhesive tables. That is, the heating elements in such tables are divided into eight zones indicated in FIG. 20 by the dotted line enclosures. These zones are also indicated in FIG. 29 by the boxes 203. The temperature is sensed in each of these zones (each heat table zone provides information to the PLC on 30 second intervals) and fed to the PLC 200 which reacts by changing the heat application provided at each as is appropriate. In other words, the controller applies different rates of energy to be turned into heat in the different zones. In this connection, problems relating to heating have occurred in the past due to changes in production rates, moisture content and various other factors. These problems have included scorching of fiber surfaces and curing of adhesives too quickly. The present invention overcomes these problems by relating production rates to temperature settings.

Another control incorporated into the invention is the control of the electrical motors which provide operation of the bale conveyor, the preshredder conveyor, the main conveyor, the variable speed precompactor, the main drive motor and the adhesive application motor. The motors used at these locations are frequency controlled and are represented in FIG. 29 by boxes 204. The start/stop time for all of these motors is input into the PLC as is represented by box 205 and the motor operation is controlled by the PLC 200. Each motor will also feed information to such PLC.

As mentioned previously, a load cell is provided to measure the extrusion force as indicated by box 206. The PLC responds to such measurement and a measurement of the extrusion pressure offset torque (box 207) by changing the offset torque as is appropriate. A line speed measuring wheel is positioned after the heat tables to send information to the PLC 200 as to the linear movement of the board at such location. The feeding of line speed information to the PLC is represented by box 208.

The saw operation is also activated by the PLC and each board cut is recorded as indicated in FIG. 29 by block 209. After each board is end capped, it is weighed and that information is sent to the PLC. This operation is represented in FIG. 29 by the inclusion of box 211. A digital readout of the weight also can be provided to the end cap operator. When each board is palletized, it triggers a counter and that information also is fed to the PLC. Block 212 is included in FIG. 29 to represent the board count.

Information as to the state of the moisture applicator at any given time is also fed to the PLC as indicated by block 213. One of course can provide an emergency stop of the whole operation (box 214) and the electrical consumption over a given time, e.g., during a shift is recorded. Although not shown, it will be recognized that other variables may be controlled or recorded as desired. For example, the volume of adhesive can be fed to the PLC and thence to the PC 201.

It will be seen from the above that the control system enables not only real-time control of operation but also a recording of information which may be useful for purposes, such as maintaining density and quality control.

As mentioned at the beginning of the detailed description, applicant is not limited to the specific embodiment and variations described above. The claims, their equivalents and their equivalent language define the scope of protection.

What is claimed is:

1. In apparatus for making compressed fiber structural board by compacting agricultural fibrous matter, which apparatus includes an oscillating ram for forcing fibrous matter through extrusion structure to form a compacted core of fibrous matter for said board, said ram including a modular ram head to engage said fibrous matter, said ram head having an upper surface, opposed sides and a front, the combination comprising:

an interior base module which defines the general configuration of said ram head;

an upper exterior wear plate providing said ram head upper surface and covering said base module;

one or more height spacers sandwiched between said upper wear plate and said base module;

a pair of side blocks respectively secured to opposed sides of said ram head, which side blocks are replaceable to accommodate a selected height and width for said ram head; and a replaceable front wear plate secured to the front of said base module for engaging fibrous matter and compacting the same for the formation of said compacted core.

2. The apparatus of claim 1 wherein said ram head further includes one or more projections for providing a void in the fibrous matter which is compacted to form said core, to thereby form a core hole lengthwise through said core.

3. The apparatus of claim 1 wherein said replaceable front wear plate has upper and lower edges and further including an edge insert for the upper edge of said front wear plate.

4. The apparatus of claim 3 wherein said edge insert is configured to cooperate with a knife blade during installation of said ram to shear fibrous matter to be compacted for the formation of said core.

5. The apparatus of claim 3 further including an edge insert for the lower edge of the front wear plate.

6. In apparatus for making compressed fiber structural board by compacting agricultural fibrous matter, the combination comprising:

(A) an oscillating ram for forcing fibrous matter through extrusion structure to form a compacted core of fibrous matter for said board;

(B) a packer positioned to receive fibrous matter and configured to deliver fibrous matter to the front of said ram to be engaged thereby; and (C) precompacting apparatus configured and positioned to receive fibrous material and provide a preselected volume of the same to said packer.

7. The apparatus of claim 6 wherein said precompacting apparatus includes a mechanism enabling adjustment of the size of said volume.

8. The apparatus of claim 6 wherein said ram includes a modular ram head to engage said fibrous matter, said ram head having an upper surface, opposed sides, a front, and comprising:

an interior base module which defines the general configuration of said ram head;

an upper exterior wear plate providing said ram head upper surface and covering said base module;

one or more height spacers sandwiched between said upper wear plate and said base module;

a pair of side blocks respectively secured to opposed sides of said ram head, which side blocks are replaceable to accommodate a selected height and width for said ram head; and a replaceable front wear plate secured to the front of said base module for engaging fibrous matter and compacting the same for the formation of said compacted core.

9. The apparatus of claim 6 further including a suspension arrangement for a ram head of said ram which engages fibrous material for said compacting, comprising:

a support for said ram head rigidly securable thereto and mounted for reciprocal movement;

a pair of guide rails under said support respectively adjacent opposed sides thereof defining the path of movement of said support and, hence, of said ram head;

spaced bearings having first riding surfaces engaging respective ones of said guide rails;

side rails respectively on opposed sides of said support for movement therewith along said path; and a plurality of bearing structures engaging said side rails, said structures being configured to engage said side rails during said reciprocable movement and resist movement of said support away from said path, each of said bearing structures including means facilitating adjustment of the same sideways relative to said support and side rail.

10. The apparatus of claim 1 further including:

(A) mechanism for forming a generally uniformly dense mat of fibrous matter from which said structural board is to be made; and (B) a moisture applicator positioned and configured to apply moisture to said mat prior to the formation of said board from fibrous matter of said mat.

11. In apparatus for making compressed fiber structural board by compacting agricultural fibrous matter, which apparatus includes an oscillating ram for forcing fibrous matter through extrusion structure to form a compacted core of said fibrous matter for said board, a suspension arrangement for a ram head of said ram which engages fibrous matter for said compacting comprising:

a support for said ram head rigidly securable thereto and mounted for reciprocal movement;

a pair of guide rails under said support respectively adjacent opposed sides thereof defining the path of movement of said support and, hence, of said ram head;

spaced bearings having first riding surfaces engaging respective ones of said guide rails;

side rails respectively on opposed sides of said support for movement therewith along said path; and a plurality of bearing structures engaging said side rails, said structures being configured to engage said side rails during said reciprocable movement and resist movement of said support away from said path, each of said bearing structures including means facilitating adjustment of the same sideways relative to said support and side rail.

12. The apparatus of claim 11 wherein each of said guide rails has a pair of second riding surfaces which are not in engagement with said spaced bearings, which second riding surfaces are mounted to be brought into engagement with said bearings in place of said first riding surfaces.

13. In apparatus for making compressed fiber structural board by compacting agricultural fibrous matter, the combination comprising:

(A) mechanism for forming a generally uniformly dense mat of fibrous matter from which said structural board is to be made; and (B) a moisture applicator positioned and configured to apply moisture to said mat prior to the formation of said board from fibrous matter of said mat.

14. The apparatus of claim 13 further including an oscillating ram for forcing fibrous material through extrusion structure to form a compacted core of fibrous matter for said board, said ram including a modular ram head to engage said fibrous matter, said ram head having an upper surface, opposed sides, and a front, and comprising:

an interior base module which defines the general configuration of said ram head;

an upper exterior wear plate providing said ram head upper surface and covering said base module;

one or more height spacers sandwiched between said upper wear plate and said base module;

a pair of side blocks respectively secured to opposed sides of said ram head, which side blocks are replaceable to accommodate a selected height and width for said ram head; and a replaceable front wear plate secured to the front of said base module for engaging fibrous matter and compacting the same for the formation of said compacted core.

15. The apparatus of claim 11 further including:

(A) an oscillating ram for forcing fibrous matter through extrusion structure to form a compacted core of fibrous matter for said board;

(B) a packer positioned to receive fibrous matter and configured to deliver fibrous matter to the front of said ram to be engaged thereby; and (C) precompacting apparatus configured and positioned to receive fibrous material and provide a preselected volume of the same to said packer.

16. In apparatus for making compressed fiber structural board by compacting industrial fibrous matter, which apparatus includes an oscillating ram having a reciprocating ram head which moves toward and away from a compacted core for said board and in its toward movement forces fibrous material through extrusion structure to be part of said compacted core, and a gill arrangement in the path of movement of fibrous matter by said ram head to inhibit fibrous matter from following said ram head when said ram head moves in a direction away from said compacted core, said gill arrangement being in mounting structure and comprising a plurality of elongated gill rods for engagement with said fibrous matter to prevent movement of the same in said direction away from said compacted core, which gill rods are positioned in a base plate therefor which is easily separable from said mounting structure to facilitate replacement or otherwise changing of said rods.

17. The apparatus of claim 16 wherein said gill base plate is held in position in said apparatus within a slot in said mounting structure and within which it is slidable for removal.

18. The apparatus of claim 16 wherein said oscillating ram includes a modular ram head to engage said fibrous matter, said ram head having an upper surface, opposed sides, and a front, and comprising:

an interior base module which defines the general configuration of said ram head;

an upper exterior wear plate providing said ram head upper surface and covering said base module;

one or more height spacers sandwiched between said upper wear plate and said base module;

a pair of side blocks respectively secured to opposed sides of said ram head, which side blocks are replaceable to accommodate a selected height and width for said ram head; and a replaceable front wear plate secured to the front of said base module for engaging fibrous matter and compacting the same for the formation of said compacted core.

19. In apparatus for making compressed fiber structural board by compacting agricultural fibrous matter, which apparatus includes an oscillating ram for forcing fibrous matter through an extrusion structure to form a compact core of fibrous matter for said board, the combination comprising:

one or more heating tables as part of said extrusion structure, for applying heat to said fibrous matter; and a controller for applying different rates of energy to be turned into heat in different zones provided by said tables.

20. In apparatus for making compressed fiber structural board by compacting agricultural fibrous matter, the combination comprising:

(A) an oscillating ram head for forcing fibrous matter through an extrusion chamber to form a compacted core of fibrous matter for said board; and (B) an extrusion pressure offset configured to contact said core as it is being formed to reduce variations in the density of fibrous matter in the core as it is formed.

21. The apparatus of claim 20 further including a gill arrangement in the path of movement of fibrous matter by said ram head to inhibit fibrous matter from following said ram head when said ram head moves in a direction away from said compacted core, said gill arrangement being in mounting structure and comprising a plurality of elongated gill rods for engagement with said fibrous matter to prevent movement of the same in said direction away from said compacted core, which gill rods are positioned in a base plate therefor which is easily separable from said mounting structure to facilitate replacement or otherwise changing of said rods.

22. The apparatus of claim 20 wherein said extrusion pressure offset is configured to apply a tensile force to said core.

23. The apparatus of claim 21 further including as part of said combination a controller which responds to measurement of the extrusion force applied by said ram to said fibrous matter by changing the pressure offset provided by said extrusion pressure offset to be complementary to that provided by said ram head.

24. In apparatus for making compressed fiber structural board by forming an elongated compact core of agricultural fibrous matter, a saw arrangement for cutting said core into appropriate lengths selected for said board comprising the combination of:

A. a primary carriage arrangement having clamps to engage the core so that said primary carriage moves with said core; and B. a secondary carriage mounted on said primary carriage for movement therewith with said core, which secondary carriage includes one or more saws for engaging said core to cut the same and is movable relative to said primary carriage to locate said saw in a precise cutting position.

* * * * *